US005659237A

United States Patent [19]
Divan et al.

[11] Patent Number: 5,659,237
[45] Date of Patent: Aug. 19, 1997

[54] BATTERY CHARGING USING A TRANSFORMER WITH A SINGLE PRIMARY WINDING AND PLURAL SECONDARY WINDINGS

[75] Inventors: Deepakraj M. Divan; Nasser H. Kutkut; Donald W. Novotny; Herman L. Wiegman, all of Madison, Wis.

[73] Assignee: Wisconsin Alumni Research Foundation, Madison, Wis.

[21] Appl. No.: 535,964

[22] Filed: Sep. 28, 1995

[51] Int. Cl.⁶ ................................................ H01M 10/44
[52] U.S. Cl. ........................... 320/6; 320/15; 320/7
[58] Field of Search ........................... 320/6, 15, 17, 320/19, 57; 363/17, 21

[56] References Cited

U.S. PATENT DOCUMENTS

| | | | |
|---|---|---|---|
| 4,079,303 | 3/1978 | Cox | 320/17 |
| 4,331,911 | 5/1982 | Park . | |
| 4,479,083 | 10/1984 | Sullivan . | |
| 4,575,670 | 3/1986 | Hignutt | 320/14 |
| 4,684,814 | 8/1987 | Redomski . | |
| 4,829,225 | 5/1989 | Podrazhansky et al. . | |
| 5,003,244 | 3/1991 | Davis, Jr. . | |
| 5,151,641 | 9/1992 | Shamoto | 318/762 |
| 5,157,319 | 10/1992 | Klontz et al. | 320/2 |
| 5,166,595 | 11/1992 | Leverich . | |
| 5,177,425 | 1/1993 | Goto . | |
| 5,254,930 | 10/1993 | Daly | 320/15 |
| 5,341,083 | 8/1994 | Klontz et al. | 320/2 |
| 5,341,281 | 8/1994 | Skibinski | 363/39 |
| 5,479,083 | 12/1995 | Brainard . | |
| 5,594,320 | 1/1997 | Pacholok et al. | 320/4 |

FOREIGN PATENT DOCUMENTS

| | | |
|---|---|---|
| 0348983A2 | 1/1990 | European Pat. Off. . |
| 2-261024 | 10/1990 | Japan . |
| WO95/00978 | 1/1995 | WIPO . |

OTHER PUBLICATIONS

Heribert Schmidt, et al., "The Charge Equalizer—A New System To Extend Battery Lifetime in Photovoltaic Systems, U.P.S. and Electric Vehicles," 15th INTELEC Conference, Paris, France, 1993.

C.C. Chan, et al., "A Microprocessor Based Intelligent Battery Charger for Electric Vehicle Lead Acid Batteries", Electric Vehicle Symposium, EVS–10, pp. 456–466, Hong Kong, 1990.

Bo Lindemark, "Individual Cell Voltage Equalizers (ICE) for Reliable Battery Performance", INTELEC Conf. Rec., pp. 196–201, Kyoto, Japan, 1991.

Stephen T. Hung, et al., "Extension of Battery Life via Charge Equalization Control", IEEE Trans. om Indus. Elec., vol. 40, No. 1, pp. 96–104, Feb. 1993.

(List continued on next page.)

*Primary Examiner*—Peter S. Wong
*Assistant Examiner*—Gregory J. Toatley, Jr.
*Attorney, Agent, or Firm*—Foley & Lardner

[57] ABSTRACT

A simple, low-cost technique for charge equalization of a series connected string of battery cells is provided. The secondary windings of a transformer having a single primary winding and multiple secondary windings are connected across each battery cell to be equalized. A single power converter applies a charging signal to the primary of the transformer, inducing a charging current in each secondary which is inversely related to the charge on the battery cells to be equalized. The transformer is preferably implemented as a coaxial winding transformer having low secondary-to-secondary winding coupling. The power converter is preferably implemented as a forward converter supplied with DC power from an adjustable DC power source. A source voltage provided by the DC source may preferably be adjusted during the course of charge equalization to preferentially direct charge to weaker cells. The charge equalization system may be used in combination with a bulk charging system to provide for both rapid charging of a battery string as well as equalization of the battery cells within the string.

35 Claims, 18 Drawing Sheets

OTHER PUBLICATIONS

Sony Corporation Battery Group & Sony Energytec, Inc., "Development and Commercialization of Lithium Ion Secondary Batteries", JEC Battery Newsletter, No. 4, pp. 19–23, Jul.–Aug. 1993 (with additional copy of the drawing on p. 23).

Letter from Linear Technology Corporation, subject "Lithium Ion Battery Charger", May 31, 1994.

David Fouchard, et al., "Development of a Lithium–Ion BB–2847 Battery", Proc. 36th Power Sources Conference, pp. 69, et seq., Cherry Hill, New Jersey, Jun. 6–9, 1994.

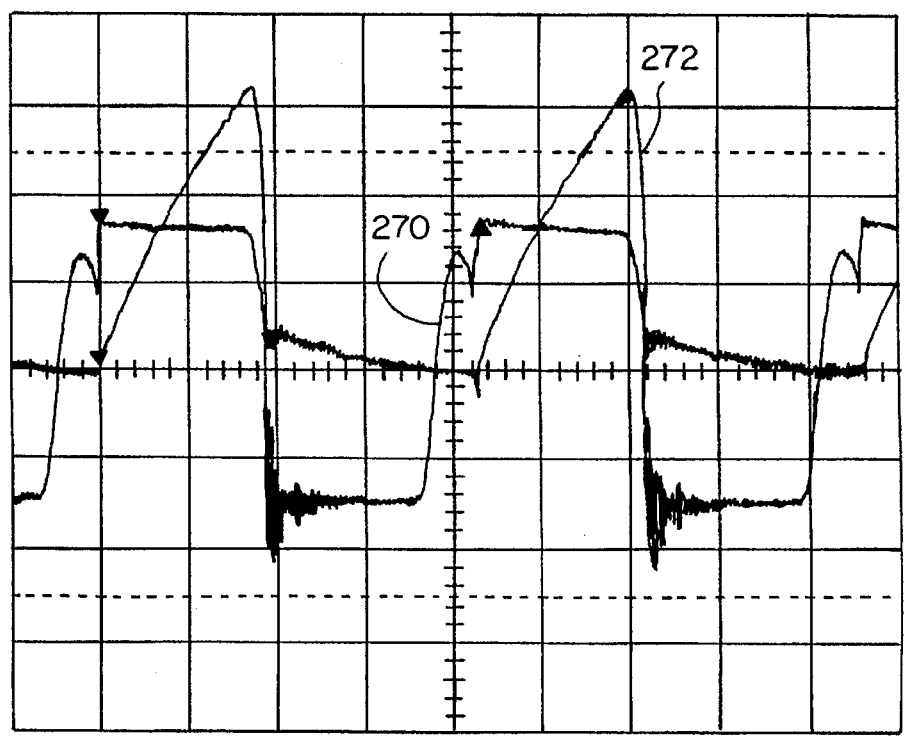
Current: 5A/div, voltage: 10V/div, time: 5μs/div
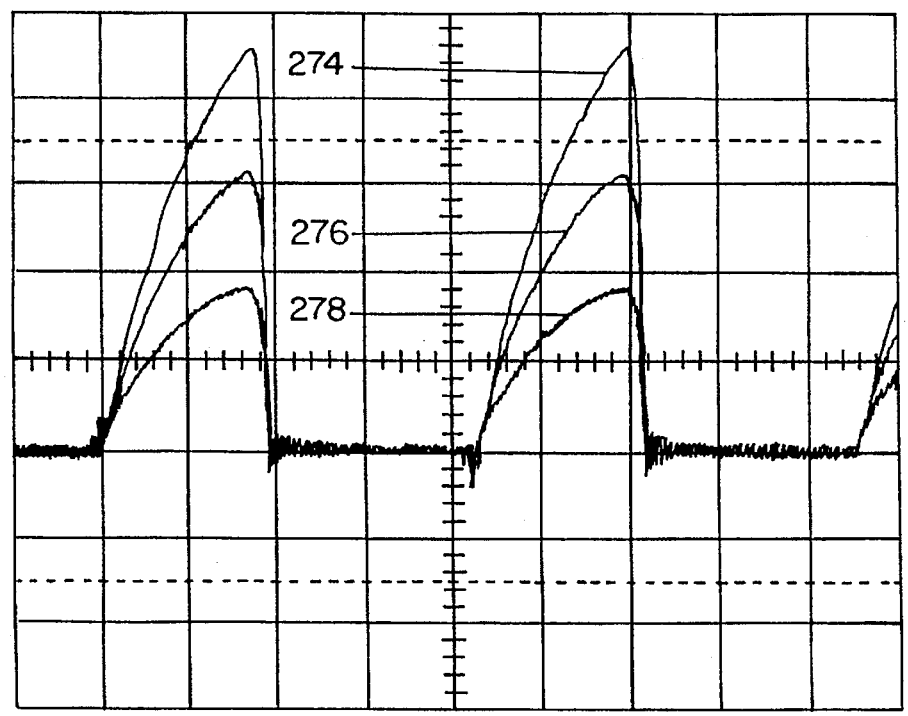
Current: 2A/div, time: 5μs/div Current: 2A/div, time: 5µs/div

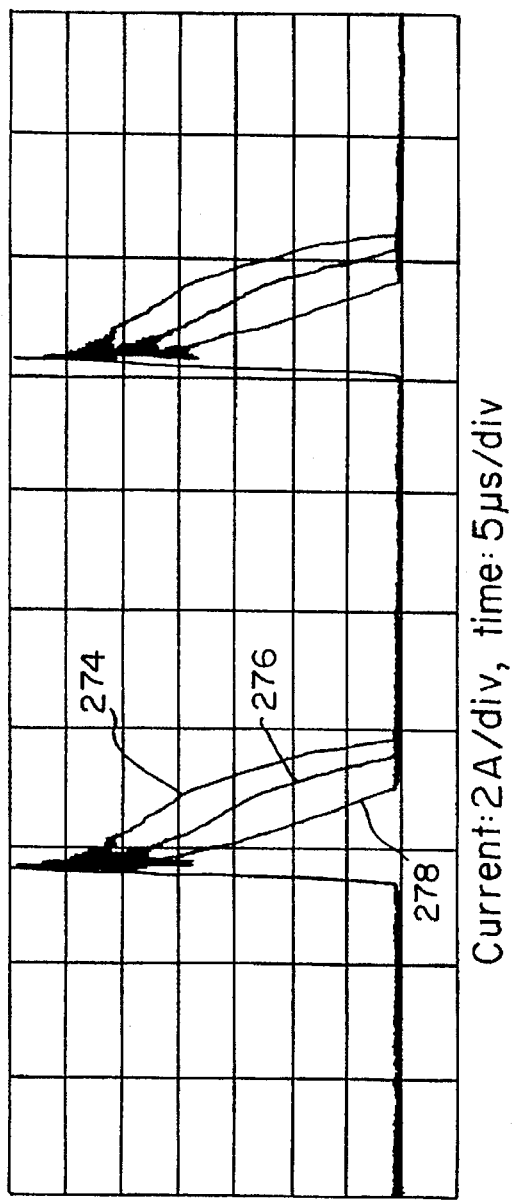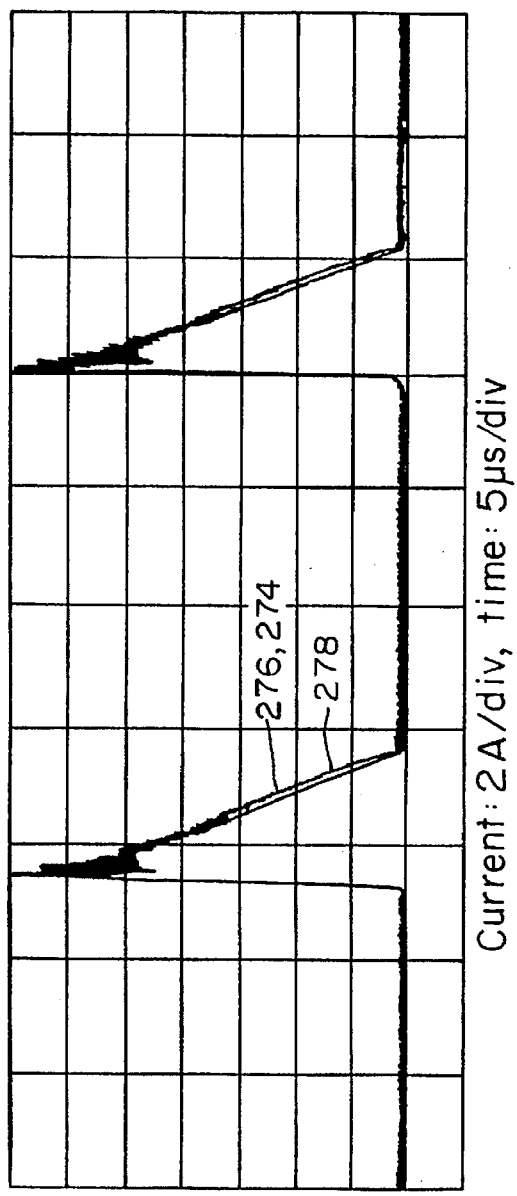

BATTERY CHARGING USING A TRANSFORMER WITH A SINGLE PRIMARY WINDING AND PLURAL SECONDARY WINDINGS

FIELD OF THE INVENTION

This invention pertains generally to systems and methods for charging batteries, and more particularly to systems and methods for charging strings of battery cells connected in series and for equalizing the charge on the cells in the battery string.

BACKGROUND OF THE INVENTION

A typical commonly used battery, such as a lead acid battery cell, includes a positive electrode, a negative electrode, and a porous separator between the two electrodes. The electrodes and the separator are positioned in a battery container where they are surrounded by an electrolyte solution. During normal operation of the battery, the electrodes undergo an oxidation-reduction (redox) reaction. This reaction effects a transfer of ions between the electrodes. The flow of ions is manifested as a charge flow, which appears as the battery current.

The basic process for charging a typical battery, such as a lead acid battery, can be divided into three stages: an efficient charging stage, a mixed charging stage, and an overcharge or gassing stage. During the efficient stage of charging a lead acid battery, the predominant charging reaction is the transformation of $PbS_4$ into Pb and $SO_2$. During this period, the charge acceptance, defined as the ratio of the current transformed into electrochemical storage in the battery to the charging current provided from the battery charger, is nearly 100%. The efficient stage of the battery charging is normally over when the battery's state of charge reaches 70–80% of its normal fully charged level.

During the mixed stage of battery charging, two processes proceed simultaneously. The main charging processes continue, while, simultaneously, water electrolysis processes begin and gradually increase. As charging continues during the mixed charging stage, charge acceptance by the battery is gradually and continuously reduced. Once the battery cell voltage shows no further increase, the battery may be considered fully charged. At this point, the mixed charging stage is terminated.

If charging of the battery continues after the battery is considered fully charged, the battery may become overcharged, resulting in gassing of the battery. As charging continues after the battery cells are fully charged, water decomposition and self discharge processes proceed in the battery. The continuing water electrolysis process causes a rather large part of the energy loss in lead acid batteries.

Water electrolysis can be caused by excessively high charging current levels, as well as by continuing to charge a battery after full charge is reached. The level of charge current flowing into a battery is typically controlled by the battery charging system. Care must be taken so that the battery charging system does not produce such a high current level that the natural redox reaction capability of the battery cell electrodes is exceeded. Such a high charging current results in electrolysis of the aqueous electrolyte.

Electrolysis of the aqueous electrolyte away from the electrodes, resulting from either overcharging or excessive charging currents, releases gaseous oxygen and hydrogen from the electrolyte instead of soluble oxygen and hydrogen ions. This produces gas bubbles close to the electrode surfaces. The gas bubbles block the flow of ions to the electrode surfaces. Therefore, the effective electrode surface area is reduced. This, in turn, diminishes the current handling capability of the battery cell.

Continued charging of a battery which has entered the gassing stage can result in pressure buildup within the battery container. If the pressure builds up beyond the seal capability of the battery container, hydrogen and oxygen gasses will leak from the battery container. The resulting fluid loss will further decrease the current handling capability of the battery cell.

To prevent overcharging and gassing, a typical battery charger will terminate charging when a battery becomes fully charged, before the onset of overcharge conditions. The onset of the overcharging condition can be detected by monitoring the battery voltage. FIG. 1 shows cell voltage versus voltage capacity returned, as a percentage of the previous charge on the battery, for different charging rates. As can be seen, cell voltage rises sharply just before the battery cell voltage levels off at its fully charged level. This sharp rise in voltage indicates the beginning of overcharge reactions. Thus, a battery charger can detect the voltage rise and stop charging in order to avoid overcharge and gassing of the battery cell.

FIG. 1 also illustrates another interesting charging characteristic of many batteries. The lines 41–44 in FIG. 1 indicate battery capacity returned for different charging rates. The charging rates are presented as a fraction of C which is the rated amp-hour capacity of the battery cell. For example, line 41 indicates battery capacity returned for a battery charged at C/5 amps/hour. It is apparent from FIG. 1, that, for the onset of overcharge reactions to coincide with 100% return of battery cell capacity, the charge rate must typically be less than C/100. At higher charge rates, premature gassing will occur and charging will have to be terminated before the full battery cell capacity is reached.

Many battery powered systems require series connected strings of batteries to achieve desired operating voltage levels. For example, electric vehicles (EVs) employ series connected battery strings with total bus voltages in the range of 300 volts to realize the main motive force of the vehicle. Battery life, and the corresponding requirement to increase the time between rechargings, is one of the major factors presently limiting the realization of economically viable EVs. One method of increasing battery life is to improve the systems and methods for charging the series connected battery strings which power the EVs. The key to increasing battery life of a series connected string of cells is equalization of the charge on the individual cells which make up the series connected battery string. Maintenance of cells at an equalized charge level is critical for enhanced battery life. Charge equalization enhances uniformity of the battery cells, improving the life of the individual cells, and improving the life of the battery string as a whole.

During charging of a battery composed of a series connected string of cells, individual cells will often become charged to different levels, and will obtain correspondingly different cell terminal voltages. These potentially large non-uniformities among the battery cells are due to differences in cell chemistry, temperature gradients along the string of battery cells which effect their charging and discharging rates, and normal differences which occur during repeated cycles of cell charge and discharge. When a battery string is charged as a whole, individual battery cells are charged serially. Thus, some cells will reach full charge before other cells, due to the fact that some cells will simply charge more rapidly than others. Significantly, some cells will reach full charge before the overall battery terminal voltage reaches its nominal level. Charging of the battery string beyond this point can, therefore, lead to overcharging of a subset of the battery string cells. If these cells are charged beyond the onset of the gassing stage, there can be significant degradation of the life of both the individual battery cells, and the battery string as a whole. There is also the potential for damage to the overcharged battery cells. If, on the other hand, the charging process is stopped when only some of the battery cells are fully charged, the capacity of the battery string as a whole will not be fully utilized. Moreover, this would increase the risk of the undercharged cells going into polarity reversal during a deep discharge of the battery string.

Several schemes and algorithms for charging series connected strings of battery cells have been proposed. One method of charging a series connected string of battery cells which has been proposed involves multi-step constant current charging. In accordance with this method, the maximum current that the battery charger can deliver is applied to the battery string at the initiation of charging, when the battery cells are at a low state of charge. As the state of charge of the battery string begins to build up, the charging current is gradually reduced in steps. Periodic rest, or cooling periods are incorporated into the battery charging process. These rest periods are used to reduce temperature differences among the cells which make up the battery string. This will tend to equalize the charge on each of the individual cells making up the battery string. Finally, equalization charging is applied at low current levels to the battery string to improve the battery capacity.

A fast charging algorithm for the charging of a series connected string of battery cells has also been proposed. This fast charging method includes three operational modes: an active-charge mode, an active-discharge mode, and an inactive rest mode. During the active-charge mode, positive pulses are applied to the battery string to supply energy to the battery. During the active-discharge mode, a sharp depolarization pulse, of much shorter duration than the active-charge mode pulses, is applied to the battery string to position the electrolyte ions in the battery cells away from the battery electrode plates. During the inactive rest mode, a stabilization or rest period is used to position the electrolyte ions at an optimum distance away from the electrode plate surfaces. Throughout this process, battery cell monitoring is used to optimize the charging algorithm.

Other schemes and algorithms for charging a series connected string of battery cells have been suggested. Most of these schemes, including those discussed above, deal with charging the entire string of battery cells as a whole. Thus, charging is provided to the entire string of battery cells at the terminals of the battery cell string. Using these whole string charging methods, the equalization of charge on individual cells which make up the battery string cannot be easily achieved.

To prevent the adverse effects of unequalized charging of battery cells, individual cells, or modules, need to be maintained at an equalized charge level during the charging process. Methods to achieve such charge equalization have been proposed which involve charging a string of battery cells by monitoring and recharging the battery cells on a single cell basis. By these methods, it is possible to maintain each battery cell at its optimal operating point, and to thereby maximize the life of the battery cell string as a whole. Typically, however, this is an expensive and inefficient approach to charging a series connected string of batteries.

A similar approach to equalization of charge across a series connected string of battery cells involves the use of an individual cell voltage equalizer across each battery cell in the string. The individual cell voltage equalizers are voltage controlled current shunts which divert current away from the individual cells during trickle charging. Trickle charging is typically constant voltage, low current charging, which is applied to a battery or string of battery cells as the battery or battery string approaches the fully charged state. The individual cell voltage equalizer scheme prevents fully charged cells from being overcharged, while undercharged cells can still be trickle charged. This scheme can be implemented using low power DC-to-DC converters across each battery cell. However, this scheme will typically be relatively expensive, due to the additional hardware and control which must be associated with each battery cell in the battery string.

A compromise to individual charging of each battery cell in a large string of cells is based on the recognition that battery life, under a normal operating cycle, tends to degrade almost exponentially as the battery string length is increased. Thus, a reasonable effort may be made to extend battery life by attempting to equalize small strings of battery cells within the main string of battery cells, instead of attempting to equalize the charge on each single battery cell. For example, in electric vehicle applications, the nominal battery voltage of 300 volts requires 25 stacks of 12 volts each. Each stack includes several battery cells connected in series. The present approach to charging the series connected battery string involves monitoring each 12 volt stack to detect the onset of the gassing stage. At this point, fast charging of the battery string may be stopped. Charge equalization may then be attempted on the entire series connected battery string by applying a smaller charge current to the string. This process, however, is not desirable because, even at the smaller current levels, the battery charger continues to pump charge into overcharged battery cells. As described above, an alternative approach to charge equalization in this case would be to use 25 battery charger converters, one for each stack. Thus, the charge rates for each of the stacks could be independently controlled to better equalize the final cell voltage. However, the increased hardware and control requirements would make this approach too expensive.

SUMMARY OF THE INVENTION

A simple, low-cost technique for charge equalization of a series connected string of battery cells is provided. The present invention provides a system and method for achieving the substantial advantages resulting from accurate charge equalization, including reduced risk of damage to battery cells in the series connected battery string, and a dramatic increase in battery life. Battery charge equalization in accordance with the present invention takes advantage of the basic charge equalization concept that, although individual battery cell voltages will depend on battery chemistry, temperature, and other related parameters during charging, individual cell voltages will achieve the same value once they have reached the final state of charge.

Charge equalization in accordance with the present invention employs a single charge equalization converter stage for the entire battery string of cells. The charge equalization converter may provide both trickle charging and charge equalization to the string of battery cells. Various DC-to-DC converter topologies may be used to implement the charge equalization converter, including forward or flyback converter topologies. A transformer having a single primary winding and multiple secondary windings is used to link the converter to the individual battery cells. For the preferred forward converter topology, a converter bridge is used to convert a DC source voltage to an AC voltage signal on the primary of the multi-winding transformer. Each of the secondary windings of the multi-winding transformer is connected to a cell of the battery string to be charged. A rectifier, such as a diode, is connected in series with each secondary transformer winding and the cell to be charged to half-wave rectify the voltage appearing on the transformer secondary. Preferably, a capacitive output filter is connected across each battery cell to filter out any high frequency ripple produced by the converter. The magnitude of the charging current appearing on each secondary winding depends on the difference between the voltage level of the battery cell connected to the winding and the rectified voltage appearing across the secondary winding. Those cells which are at a lower voltage, and are thus less fully charged, will receive a higher charging current than those cells which are more fully charged. Cells which are fully charged will receive no charging current, and thus will not become overcharged. A sensing and control system is preferably used to monitor the charge equalization process. Charge equalization may be terminated when all battery cells reach their fully charged voltage level. The DC voltage source which provides power to the charge equalization converter may preferably be implemented as a controllable DC-to-DC converter which pre-regulates the source voltage level and may be controlled by the sensing and control system to adjust the source voltage level for optimum charge equalization.

The multi-winding transformer employed by the charge equalization system of the present invention is preferably simple in structure, easy to manufacture, and has tightly controlled parasitics. The transformer preferably provides for symmetrical energy transfer to each cell connected to its secondary windings. A coaxial winding transformer is preferably used. The coaxial winding transformer (CWT) is preferably implemented using multiple coaxial cables wound around a transformer core. The outer conductors of the coaxial cables are connected in parallel to form the primary winding of the transformer. The inner conductors of the coaxial cables form the secondary windings which are connected to provide the charging current to each cell in the battery string.

The charge equalization system of the present invention may be used in combination with a bulk charger to implement a complete rapid charging and charge equalization system for a series connected string of battery cells. Where the bulk charging system is capable of providing a trickle charge to the battery string, the charge equalization system may be connected to run simultaneously with the bulk charger to provide the charge equalization function simultaneously with the trickle charge being provided by the bulk charger. In a more typical application, the bulk charger will be used for rapid charging of the battery string while the sensing and control system continuously monitors the voltage on each battery cell through voltage sensing wires. When one of the battery cells reaches or approaches its fully charged voltage level, bulk charging of the battery string will be terminated, and charge equalization will be initiated. In this case, the charge equalization system of the present invention will simultaneously provide trickle charging of the battery string, to bring the battery string to the fully charged level, and charge equalization, to equalize the charge on each of the batteries in the string. When the battery is fully charged, and the battery cell voltages are equalized, the charge equalizer may be turned off, as no further charging current will be delivered to the battery cells. Alternatively, the charge equalizer may be left on to provide continuous trickle charge to the battery cells. Integrating the trickle charge function with the charge equalization function leads to greater efficiency and lower cost implementation of a charging mechanism for the battery string as a whole.

Further objects, features and advantages of the invention will be apparent from the following detailed description when taken in conjunction with the accompanying drawings.

BRIEF DESCRIPTION OF THE DRAWINGS

FIG. 27 is a graph of voltage and current waveforms in the primary winding of a forward charge equalization converter in accordance with the present invention at the beginning of a charge equalization period.

FIG. 28 is a graph showing the waveforms of battery charging currents to three initially differently charged battery cells at the beginning of charge equalization in accordance with the present invention using a forward charge equalization converter.

FIG. 31 is a graph showing the waveforms of battery charging current to three initially differently charged battery cells at the beginning of charge equalization in accordance with the present invention using a flyback converter topology.

FIG. 32 is a graph showing the waveforms of battery charging current to three initially differently charged battery cells near the end of charge equalization in accordance with the present invention using a flyback converter topology.

DETAILED DESCRIPTION OF THE INVENTION

A battery charging system in accordance with the present invention is used for charging a series connected string of battery cells. Throughout this description, the terms "cells" and "battery cells" are used to refer generally to battery cells which are connected in series to form a single battery, single batteries which are connected in series to form a battery stack, battery stacks which are connected in series to form higher voltage battery stacks, or any energy storage cell which may be charged and which is connected in series with other energy storage cells. Individual batteries which are connected in series to form larger battery systems are often referred to as modules, and are considered to be included under the term "battery cells" as used in this disclosure.

A battery charging system in accordance with the present invention employs three fundamental modes to fully charge a series connected string of battery cells. Rapid bulk charging is used to bring the voltage of the battery string to near the fully charged voltage level. Trickle charging, at a reduced charging current, is then used to complete the charging of the battery string. Charge equalization is employed simultaneously with trickle charging to equalize the charge on the individual cells which compose the battery string.

Figure 1:
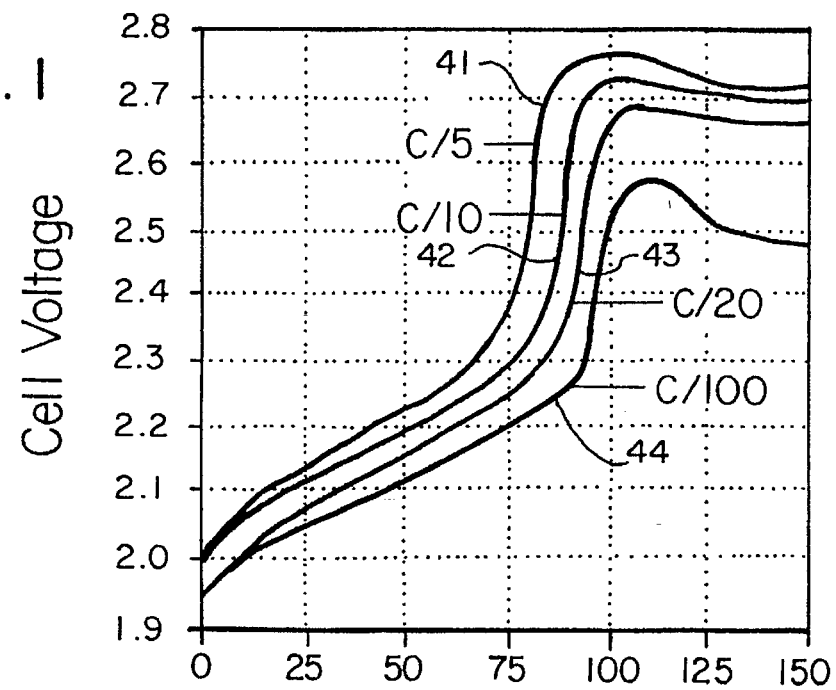
FIG. 1 is a graph of battery cell voltage versus capacity returned as a percentage of previous charge for different battery charging rates.
Figure 2:
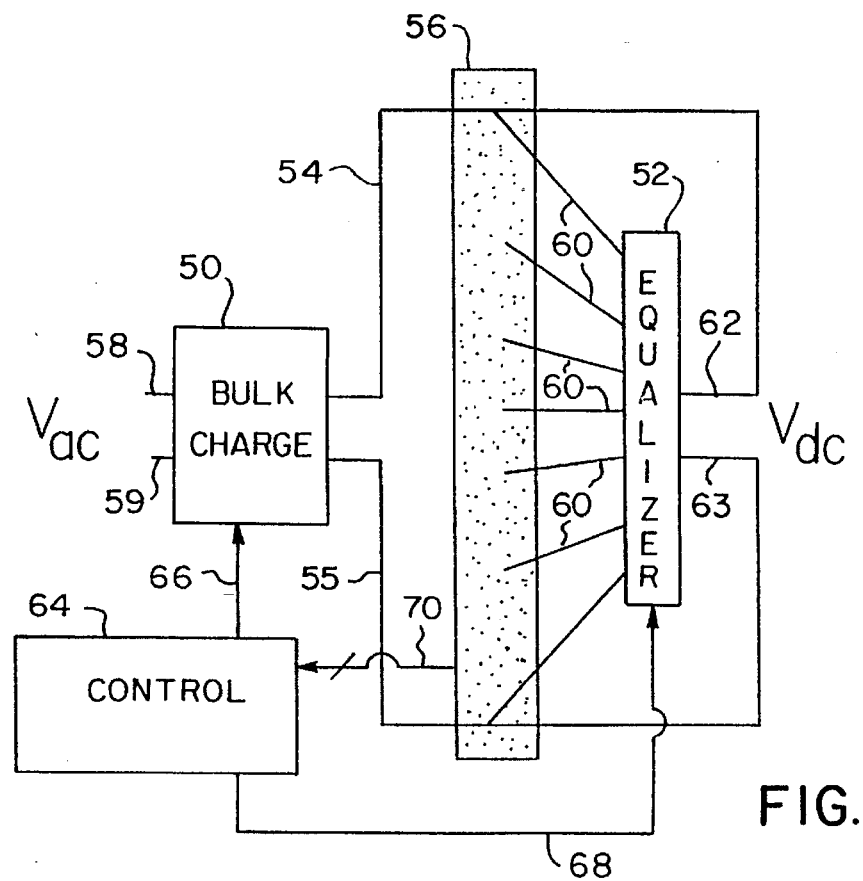
FIG. 2 is a system level block diagram of a battery charging system in accordance with the present invention for providing bulk charging and charge equalization of a series connected battery cell string where trickle charging is provided by the bulk charging portion of the system.

As shown in FIG. 2, a battery charging system in accordance with the present invention preferably includes two independent charging circuits, a bulk charging system 50 and a charge equalization system 52. The bulk charger 50 is connected by lines 54 and 55 to opposite ends of a battery string, schematically illustrated in FIG. 2 as block 56. Thus, the bulk charger 50 is used for charging the battery string 56 as a whole. The bulk charger 50 will typically receive input power from an AC source, such as conventional AC power lines at lines 58 and 59, which is then converted to regulated DC power by the bulk charger 50 for battery charging on lines 54 and 55.

The charge equalization circuit 52 is connected by lines 60 to each cell (not shown in FIG. 2) of the series connected battery string 56. Thus, charge equalization is performed independently on each battery cell by a single equalization system 52. The charge equalization system 52 is preferably provided DC power on lines 62 and 63 from the bulk charger 50. A system controller 64 is used to control the bulk charging system 50 and charge equalizing system 52 by control signals applied to the bulk charging system 50 on a line 66 and to the charge equalization system 52 on a line 68. The system controller 64 receives signals on voltage sensing lines 70 which are connected across the individual cells which comprise the series connected battery string 56.

During the bulk charging period, the bulk charger system 50 is active, typically applying a relatively high charging current to the series connected string of battery cells 56 to rapidly charge the string of cells 56. Each individual battery cell in the string 56 is monitored for overcharging by the control system 64 via the voltage sensing wires 70. Alternatively, groups of cells or the entire string 56, rather than individual cells, may be monitored, although the monitoring of each individual cell is preferable. If any of the cells reaches its nominal fully charged voltage level, or if gassing conditions are detected by the control system 64, a control signal is applied on line 66 to the bulk charging circuit to stop the fast charging period. At this point, a signal on line 68 from the control system 64 enables the charge equalization circuit 52. Charge equalization can best operate after full rate charging by the bulk charging system 50 is terminated following the detection of a full charge voltage level on any of the cells in the battery string 56.

Trickle charging, to bring the battery string 56 to its fully charged voltage level, may be performed by either the bulk charger 50 or the charge equalization system 52. For trickle charging by the bulk charger, the bulk charger voltage level is reduced following the rapid bulk charging period when the battery string voltage approaches the fully charged voltage level. The bulk charger 50 remains active throughout the trickle charge period at this lower charging level. The charge equalizer system 52 is also activated during this period. As shown in FIG. 2, the charge equalizer may be fed directly with DC power off of the battery string 56 which is also connected to the lines 54 and 55 of the bulk charger 50. The charge equalization system 52 thus acts to distribute the trickle charge across the battery string 56 among the individual cells which compose the battery string to equalize the charge on the cells.

Figure 3:
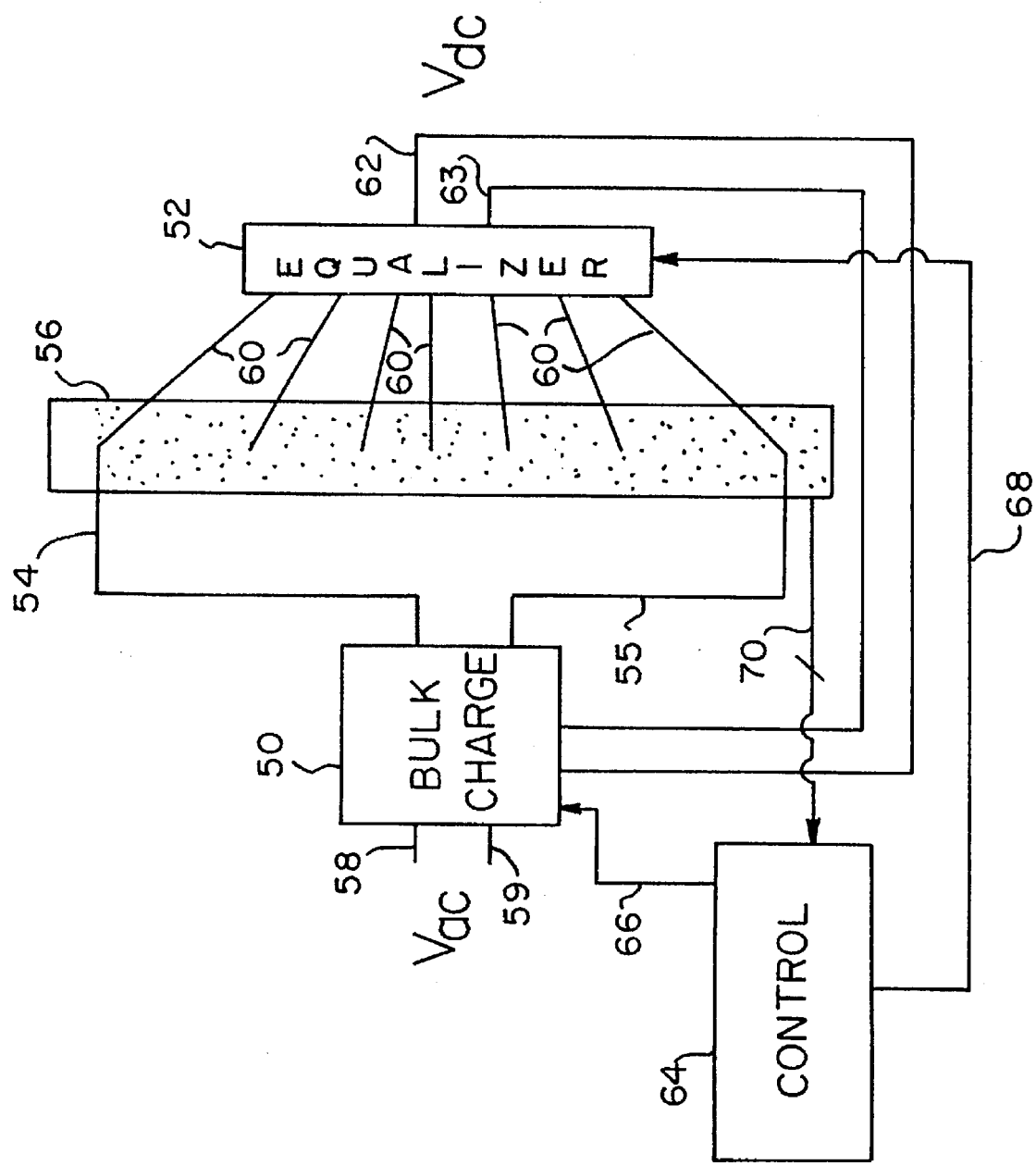
FIG. 3 is a system level block diagram of an alternative configuration for a battery charging system in accordance with the present invention where trickle charging is provided by the charge equalization portion of the system.

Typically, bulk chargers are not optimized for trickle charge operation. Thus, it is preferable that, after rapid bulk charging brings the battery string voltage to near the fully charged level, the bulk charger 50 be turned off, and the charge equalization system 52 be turned on to implement both the trickle charging and charge equalization functions simultaneously. If the charge equalizer 52 is operated after the termination of bulk charging to assume both the charge equalization and trickle charge functions, a system structure as shown in FIG. 3 is preferably employed. The components shown in FIG. 3 are the same as those shown in FIG. 2, although connected in a different manner, and as such are labeled with the same reference numerals. In this configuration the charge equalizer 52 is supplied with DC power on lines 62 and 63 from the bulk charger 50, which typically includes one or more power converter circuits including an AC-to-DC converter. However, since the bulk charger 50 is turned off during the trickle charge and charge equalization period, the voltage supplied to the equalization circuit 52 may not be the voltage provided by the bulk charger on lines 54 and 55 to the battery string 56. Trickle charging by the charge equalization system 52 is an optimal solution to charging the battery string. This is due to the fact that the charge equalization system of the present invention 52 is optimized for low power operation, which is required for both trickle and charge equalization charging.

It should be noted that, for either of the system configurations shown in FIGS. 2 or 3, the charge equalization system 52 may be operated simultaneously with the bulk charger 50 to optimally charge the battery string 56. The different modes of operation in which the bulk charger 50 and charge equalization system 52 may be operated will impact the power rating of the charge equalization circuit 52. It should also be noted that both the bulk charge circuit 50 and charge equalization circuit 52 are shown to be fed ultimately from the same AC power source. This is a preferred implementation, however, power may be provided to the bulk charger 50 and charge equalization system 52 from independent AC or DC power sources if desired.

Figure 4:
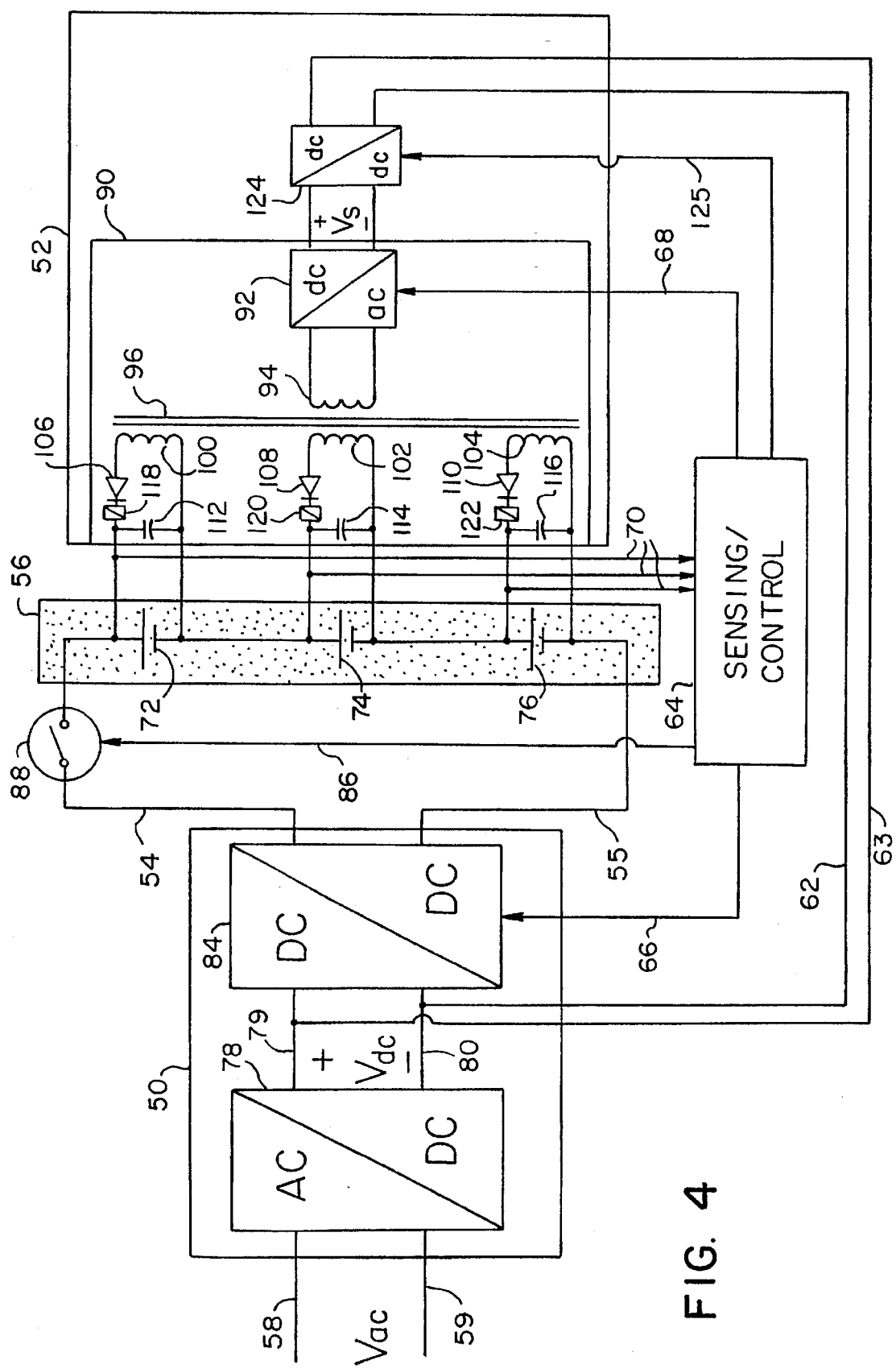
FIG. 4 is a schematic block diagram of a bulk battery charging and charge equalization system in accordance with the present invention.

A more detailed description of a battery charging system in accordance with the present invention is provided with reference to the schematic block diagram of FIG. 4. The system configuration shown in FIG. 4 is for charging and charge equalization of a series connected battery string 56 including three battery cells 72, 74, and 76. Of course, a battery string 56 including more or fewer battery cells may be charged using the charging and charge equalization system of the present invention.

A typical bulk charging circuit 50 will include a conventional AC to DC converter 78. The converter 78 converts an AC input voltage $V_{ac}$ on lines 58 and 59, such as from a conventional line power source, to a DC voltage level $V_{dc}$ on lines 79 and 80. This DC voltage $V_{dc}$ may be provided on lines 62 and 63 to the charge equalization circuit 52 to provide power for the charge equalization circuit 52. The DC voltage $V_{dc}$ is also applied to a DC-to-DC converter 84 which is part of the bulk charging circuit 50. The converter 84, in turn, applies a regulated bulk charging voltage level across the battery string 56 during the bulk charging mode. Note that the bulk charging circuit configuration shown is only exemplary, and other conventional rapid or bulk charging circuits may be used in accordance with the present invention.

Voltage sensing lines 70 connected to the individual battery cells 72, 74 and 76 of the battery string 56, are preferably continually monitored by the sensing and control circuit 64. The sensing and control circuit 64 may be implemented in any conventional manner using analog or digital circuit components or, in whole or in part, using a program controlled microprocessor. Most known battery charger systems are equipped with a controller, typically a microprocessor controller, which implements the desired charging algorithm. Such a controller is required since the charging rate has to be varied, from full charging at the beginning of the charge period to trickle charging towards the end of charge period, so as to maximize total battery charge acceptance. Besides battery cell voltages, cell currents and other data may typically be fed back to the controller. Thus, the controller is provided information regarding the state of the battery cells within the stack. The sensing and control system 64 of the present invention may be implemented as a simple modification of known battery charger controllers where the charge equalization control scheme of the present invention is implemented as another charging algorithm. Thus, no separate controller is needed for bulk charging and charge equalization. The main controller 64 may preferably be programmed to assume control of the charge equalizer 52 by enabling it and by controlling its input supply voltage in the manner described in more detail below.

When the sensing and control circuit 64 detects that the battery cell voltage across one of the cells 72, 74 or 76 has reached its nominal fully charged voltage level, the control circuit 64 will terminate the bulk charging mode. Alternatively, the bulk charging mode may be terminated when the battery cell string reaches a total voltage level approaching, but less then, its normal fully charged voltage level. Termination of bulk charging may be accomplished by a control signal on a line 86 to a switching device 88 on one of the lines 54 connecting the bulk charger 50 to the battery string 56, which opens the switch 88, thereby disconnecting the bulk charger 50 from the battery string 56. The switch 88 may be implemented in any conventional manner, including as a relay or as a transistor, depending on the required voltage and current rating of the bulk charger 50 and battery string 56. It will typically be inefficient to implement the switch 88 as a series pass transistor which must carry the full load current of the bulk charger 50 during the bulk charging period. Therefore, termination of bulk charging is preferably provided by a control signal on the line 66 from the control system 64 to the bulk charger 50 which, for example, interrupts the drive signals being provided to the semiconductor switches of the DC-to-DC converter 84, thereby terminating the charge delivered by the bulk charger 50. After the termination of bulk charging, the control circuit 64 may send a signal on the line 68 to activate the charge equalization circuit 52. As described above, the charge equalization circuit 52 may also be active simultaneously with the bulk charging circuit 50.

The charge equalization circuit 52 includes a simple isolated DC-to-DC converter 90. The preferred charge equalization converter 90 includes a DC-to-AC converter circuit 92 connected to the primary 94 of a multi-winding transformer 96. The secondaries 100, 102, and 104 of the transformer 96 are connected across the battery cells 72, 74, and 76, respectively. The multiple winding transformer 96 is preferably characterized by low and controlled leakage inductances and well controlled fluxes. These properties form the basis for realizing a transformer which is symmetrical with respect to power distribution among its secondary windings 100, 102 and 104. As will be discussed in more detail below, a coaxial winding transformer, which is known to have these properties, is preferably employed. The DC-to-AC converter 92 converts a DC source voltage $V_s$ to an AC waveform which is applied to the primary winding 94 of the transformer 96. The waveform which appears on the secondary windings 100, 102 and 104 is half-wave rectified by rectifier diodes 106, 108 and 110, respectively. This results in a unidirectional charging current being applied to the battery cells 72, 74 and 76 to charge the cells. Preferably, capacitors 112, 114 and 116 are connected in parallel with the battery cells 72, 74 and 76 as output filters, to filter out any high frequency ripple by the converter 92, as well as to decouple unequal lead inductances between the transformer secondaries 100, 102 and 104, and the individual battery cells 72, 74 and 76. Fuses 118, 120 and 122 are preferably provided in series with the battery cells 72, 74 and 76 to provide for protection against failures during charge equalization which may result in excessively high charging currents being provided by the charge equalization circuit 52 to an individual battery cell. A controllable pre-regulator stage, such as a conventional buck-boost DC-to-DC converter with an outer control loop 124, is preferably employed in order to provide the regulated and controlled source voltage $V_s$ to the equalization converter 92. The pre-regulator stage 124 may be controlled by control signals on a line 125 from the sensing and control system 64.

The power rating of the charge equalization converter 90 depends mainly on the rating specifications for the battery string 56, in addition to the battery state of charge after high rate bulk charging is terminated. For example, the battery string capacity of the General Motors Impact EV is in the range of 13 kW-hours. Assume that the state of charge of the battery string, after high rate bulk charging is terminated, is 90% of the fully charged level. Since the charge equalizer system 52 assumes both trickle charge and charge equalization functions, the charge equalization system 52 has to supply the additional 10% of charge needed to fully charge the battery string. Thus, the charge equalization system 52 must supply an additional 1300 watt-hours. If charge equalization is set to take approximately 4 hours, a converter 90 capable of producing approximately 300 W of power will be needed. If the battery state of charge after high rate bulk charging is less than 90% of full charge level, a converter 90 having a higher rating would be required. Alternatively, the same, lower rated, converter 90 could be used, if the charge equalization circuit 52 is allowed to take a longer time to bring the battery string to the fully charged level. The required rating for the charge equalization converter 90 can be lowered further if charge equalization is enabled before the termination of high speed charging by the bulk charger 50. This will allow more power to be pumped into the weakest cells in the battery string during the high rate bulk charging period. This will also result in a higher battery state of charge overall when the high rate bulk charging period is terminated.

The capacitors 112, 114, and 116, on the outputs of the converter 90 and across the battery cells 72, 74 and 76, serve two main purposes. First, the capacitors filter out any high frequency ripple produced by the switching elements in the AC-to-DC converter circuit 92. Secondly, the capacitors act to decouple the unequal inductances in the leads which connect the transformer secondaries 100, 102, and 104 to the individual battery modules 72, 74, and 76. The rating of the capacitive filter elements 112, 114, and 116 depends on the topology and rating of the converter 90. Both forward and flyback converter topologies produce essentially triangular current waveforms. Thus, the rms current in the capacitors will be nearly the same as the average output current of the converter 90. The voltage rating of the capacitive elements 112, 114, and 116 depends on the rated voltage of the battery cells 72, 74 and 76. For example, for the converter 90 having a 300 W power rating discussed above, and assuming a maximum average winding current of 6 A, a 15 V/6 A rated capacitor would be needed. The value of the capacitance of the capacitors 112, 114, and 116 is a function of the switching frequency of the converter 92 and the inductances in the leads between the transformer secondaries 100, 102, and 104 and the individual battery modules 72, 74 and 76. The minimum capacitance value needed is given by:

$$C_f >> \frac{1}{4\pi^2 f_s^2 L_{lead}} ; \qquad (1)$$

where:

$f_s$ is the switching frequency; and $L_{lead}$ is the lead inductance of the secondary winding. Thus, at a switching frequency of 100 kHz and assuming a minimum lead inductance of 1.0 µH, a capacitor having a capacitance of at least 2.5 µF will be needed.

During the charge equalization process, a serious failure can result from having an extremely low voltage battery cell or a dead cell somewhere in the battery string 56. The charging current provided to this cell would be quite high. Since a dead battery cell is incapable of being charged, such a cell would continue to accept a high charging current without its terminal voltage being affected. The presence of such a low voltage cell may be detected by the sensing and control system 64 using the voltage sensing wires 70 across the cell. The voltage measured across the sensing wires 70 may be compared to a preset lower threshold voltage. If the measured cell voltage is below the threshold voltage, action may be taken by the control system 64 to prevent a serious failure of the charge equalization system 52. If a low voltage cell is detected, the preferable response by the control system 64 is to disconnect the low voltage cell from the charge equalization system 52, while continuing to provide charge equalization to the rest of the cells in the battery string 56. A preferred scheme for protecting the charge equalization circuit 52 against failure due to the presence of a dead cell in the battery string 56 is implemented using the fuses 118, 120, and 122 connected in series with each of the secondary transformer windings 100, 102, and 104. If the sensed voltage across a cell falls below the lower threshold level, the control system 64 acts to clear the fuse associated with the cell's corresponding secondary winding, thereby disconnecting the low voltage cell from the charge equalization system 52. Clearing of the fuse may be achieved by sending a control signal on a line 125 to the voltage source pre-regulator 124 to raise the input source voltage $V_s$ applied to the charge equalization converter 90 so as to generate a current level to the defective cell which is higher than the fuse rating. Once the failed cell is disconnected from the charge equalization circuit 52, charge equalization of the remaining battery cells can proceed normally. The control system 64 preferably informs the user about the faulty battery cell, so that the cell can be repaired or replaced. The user may be provided such failure information from the control system 64 by means of a simple indicator light, or by more detailed digital data from the control system 64 which may be viewed by the user through an output device (not shown) such as a monitor or a printer.

The objective of the charge equalization converter 90 is to direct charge from the source voltage $V_s$ to the weakest cells in the battery string 56, while delivering less charge to more fully charged cells, and no charge to those cells which are already fully charged. Any converter topology which is capable of producing a voltage on the primary winding of a multi-winding transformer, to induce a charging current on the secondary windings of the transformer which is inversely related to the charge on the battery cells 72, 74 and 76 may be used in accordance with the present invention. The choice of a converter topology used, however, will impact the simplicity of the charge equalization scheme and the implementation of the control system 64.

Figure 5:
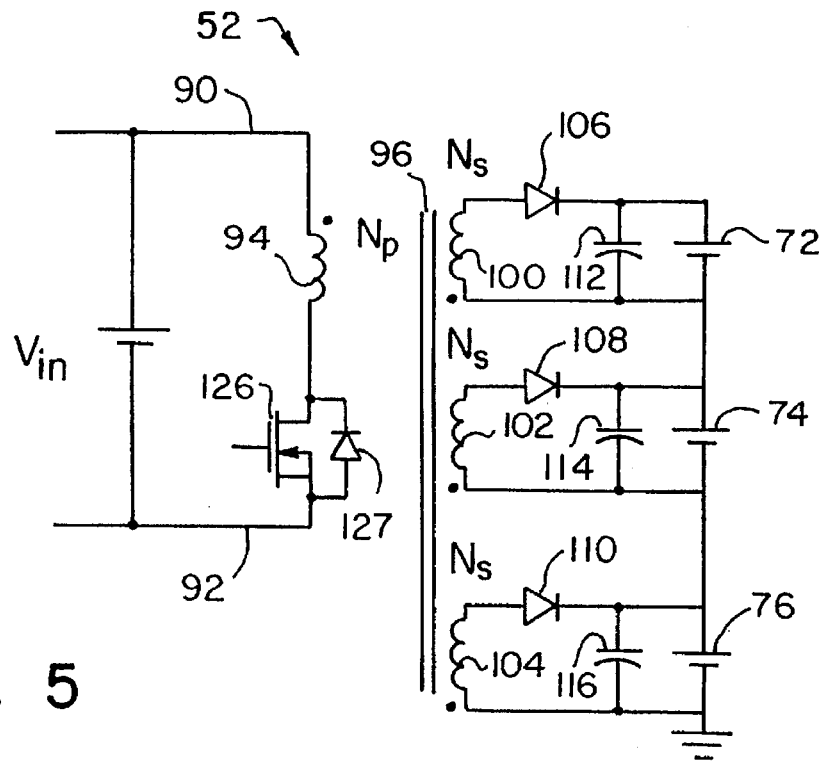
FIG. 5 is a schematic circuit diagram of a charge equalization system in accordance with the present invention employing a single-switch flyback converter for charge equalization of a three cell battery string.

Two simple converter topologies which may be used to transfer charge to the lowest voltage cells in a battery string 56, are the capacitive output forward converter, and the flyback converter. An exemplary single switch flyback topology converter 90 is shown in FIG. 5. When the switch 125, which may be implemented using a MOSFET as shown, is turned on, the input voltage $V_{in}$ induces a current in the main winding 94 of the multi-winding transformer 96 which causes energy to be stored in the magnetizing inductance of the transformer 96. Note that during this period the diodes 106, 108, and 110 are reverse biased and no charge current is delivered to the cells 72, 74, and 76. When the switch 126 is turned off, the energy stored in the transformer magnetizing inductance causes the polarity of the voltage in the primary winding 94 to suddenly reverse, causing a voltage to appear in each secondary winding 100, 102, and 104 which forward biases the diodes 106, 108, and 110 causing a charging current to be delivered to each cell 72, 74, and 76.

Figure 6:
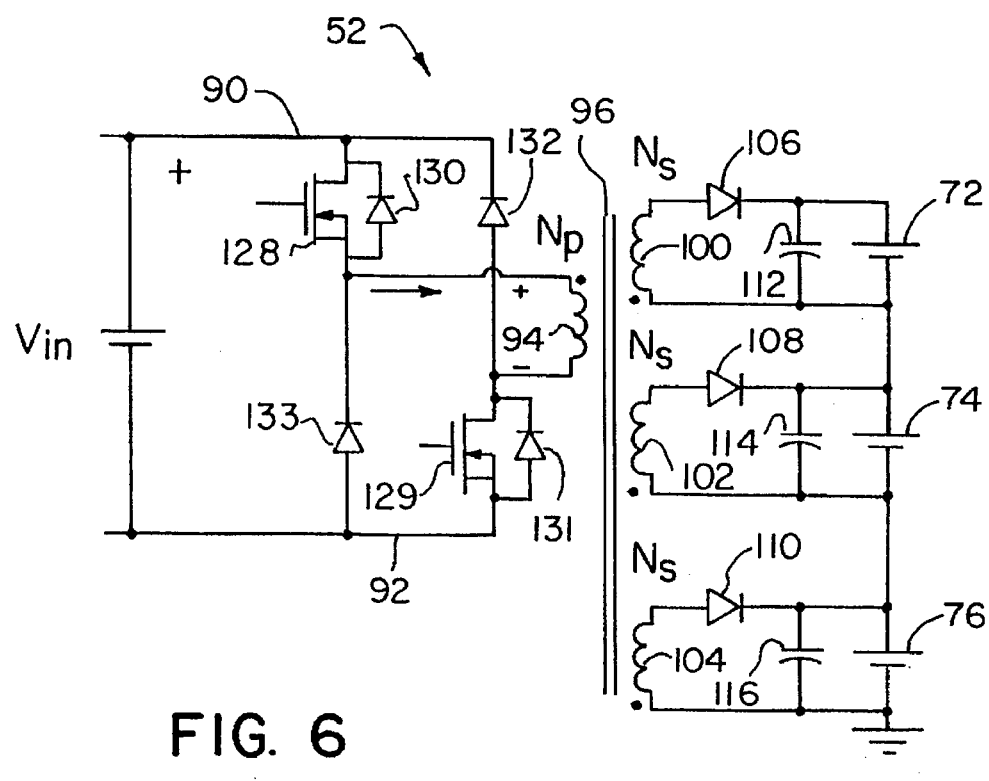
FIG. 6 is a schematic circuit diagram of a charge equalization system in accordance with the present invention employing a two-switch flyback converter for charge equalization of a three cell battery string.

An alternative flyback converter topology is the two switch flyback converter shown in FIG. 6. In this topology, two switching devices 128 and 129 with integral antiparallel diodes 130 and 131 are used to switch the input voltage $V_{in}$ across the transformer primary 94 to store energy in the magnetizing inductance of the transformer 96. Additional diodes 132 and 133 are provided to form a bridge configuration with the switching devices 128 and 129 such that a flyback current may be conducted through the diodes 132 and 133 when the switching devices are turned off. This structure results in lower voltage stresses on the MOSFET switches.

The flyback converter topology ideally transfers a specific amount of energy to the lowest voltage battery cells in the battery string 56 every switching cycle. A simple input voltage feed-forward control scheme is needed to regulate the input energy per cycle. The transfer of energy to the lowest voltage cells is accomplished via use of a well coupled multi-winding transformer. If the secondary-to-secondary coupling of the transformer is weak, the stored energy will be distributed over many modules, rather than just the weakest one. The flyback converter circuit topology thus does not benefit significantly from the use of a coaxial winding transformer. This is due to the fact that the flyback topology first stores energy in the transformer's magnetizing inductances and then delivers energy to the cells 72, 74, and 76, rather than transferring energy in the magnetic coupling of the primary side to the secondary side windings. Thus, it is also not possible to direct charge only to the weakest cell in the battery string such as would be possible using a forward converter topology. However, as will be seen, the preferred multi-winding coaxial winding transformer used in association with the forward converter topology has a 1:1 primary to secondary turns ratio. This requires the use of the pre-regulating DC-to-DC converter 124 to lower the input voltage $V_{in}$ to a source voltage level $V_s$ compatible with the individual cell voltage. With a flyback converter topology, the extra converter stage is not required since a higher primary to secondary turns ratio can be implemented to lower the input voltage to an appropriate level.

Figure 7:
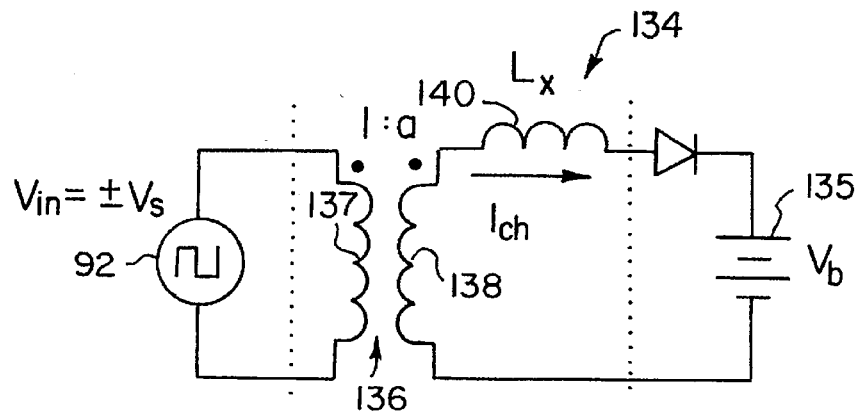
FIG. 7 is a schematic circuit diagram of a basic forward converter for charge equalization in accordance with the present invention.

The preferred topology for implementing the charge equalization converter 90 is the capacitive output forward converter. The operation of the forward converter to produce a charging current for the battery cells is described in more detail with reference to FIG. 7. FIG. 7 shows a simplified forward converter circuit at 134. The converter 134 is shown as connected to provide a charging current $I_{ch}$ to a single battery cell 135. Thus, a transformer 136 having a single primary winding 137 and single secondary winding 138 is assumed. The inductor 140 represents the leakage inductance $L_s$ of the secondary winding 138. In FIG. 7, the DC to AC converter 92 of FIG. 4 is represented as an AC voltage source producing an essentially square wave AC signal of peak voltage $V_s$. This voltage signal is applied to the primary winding 137 of the transformer 136. A corresponding voltage signal will appear on the secondary winding 138 of the transformer 136. The magnitude of the voltage appearing on the secondary winding 138 depends on the turns ratio of the transformer 136. The converter 134 has a primary to secondary turns ratio of 1:a. As will be discussed in more detail later, the preferred implementation of the transformer is as a coaxial winding transformer having a turns ratio of 1:1, i.e., a=1. It is apparent from an analysis of the circuit 134 that the current through the secondary 138 of the transformer 136, which is also the battery charging current $I_{ch}(t)$, is governed by the forward converter source voltage $V_s$, the voltage on the battery cell being charged $V_b$, and the transformer secondary leakage inductance $L_s$. The battery charging current is thus given by:

$$I_{ch}(t) = \frac{aV_s - V_b}{L_s} t; \quad (2)$$

where a is the secondary to primary turns ratio. From Equation 2, it is apparent that the charging current $I_{ch}$ can be regulated by controlling the magnitude of the charge equalization converter's supply voltage level $V_s$.

Figure 8:
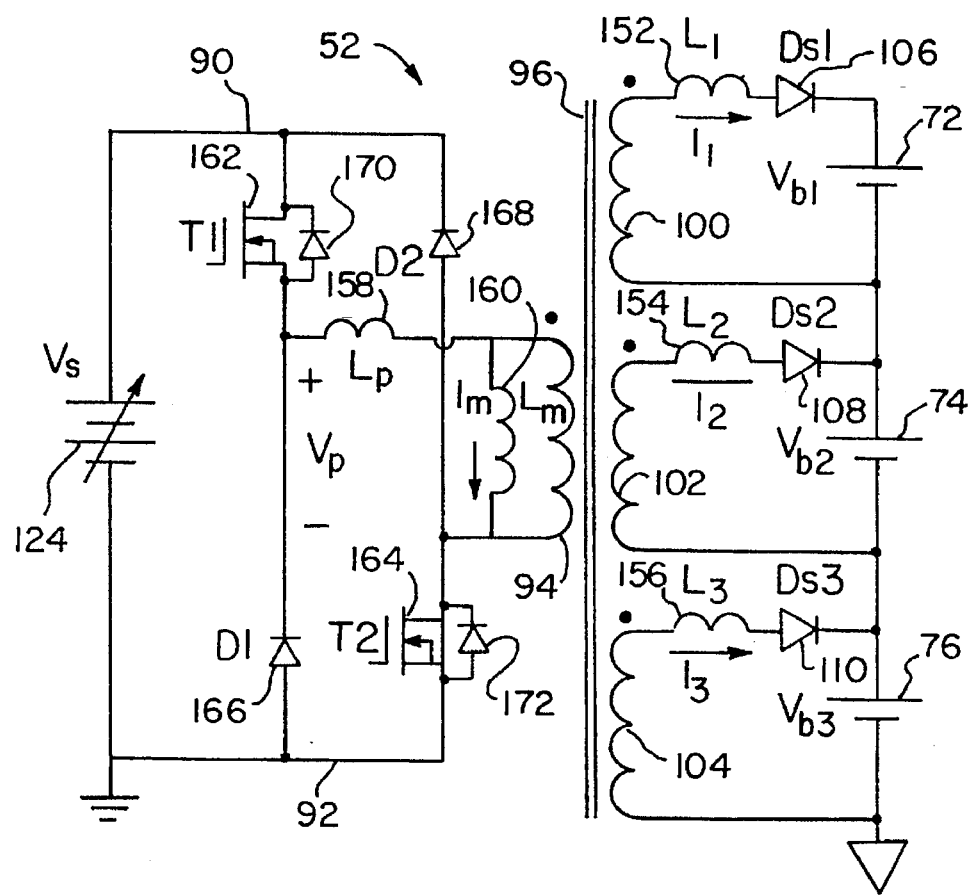
FIG. 8 is a schematic circuit diagram of a charge equalization system in accordance with the present invention employing a two-switch forward converter for charge equalization of a three-cell battery string.

The charge equalization system of the present invention 52 will be described and analyzed in more detail with reference to the schematic circuit diagram of FIG. 8. The preferred charge equalization system 52 includes the basic forward converter structure 134 of FIG. 7 expanded to provide charge equalization of multiple battery cells connected in series. Although analyzed for a battery string 56, including three battery cells 72, 74, and 76, the charge equalization system 52 may be applied to battery strings including any number of series connected battery cells or groups of battery cells. Note that since FIG. 8 will be used only to describe the basic charge equalization process of the present invention, the filter capacitors 112, 114, and 116, and fuses 118, 120, and 122 are not shown. In FIG. 8, the major parasitic elements associated with the transformer 96 are indicated as inductors 152, 154, 156, 158, and 160. The secondary leakage inductances $L_1$, $L_2$, and $L_3$ are represented by inductors 152, 154, and 156, respectively. The leakage inductance $L_p$ of the primary side of the transformer 96 is indicated by inductor 158. The magnetizing inductance $L_m$ of the transformer 96 is indicated by inductor 160. By including the leakage and magnetizing inductances as representative inductor circuit elements, the operation of the charge equalization system 52 can be analyzed accurately by assuming that the transformer itself 96, including primary winding 94 and secondary windings 100, 102, and 104, is an ideal transformer. Note that no secondary winding to secondary winding leakage components are shown in FIG. 8. This is because, as will be discussed in more detail below, no such secondary to secondary leakage components exist in the preferred transformer structure.

In the preferred embodiment of the charge equalization system 52 shown in FIG. 8, the converter 90 is chosen to be implemented as a simple two switch forward converter. As was discussed above, the converter 90 may be implemented using various other topologies, including other forward converter topologies as well as flyback converter topologies. The converter 90 includes two switching devices 162 and 164, and two diodes 166 and 168 connected in a bridge configuration to connect the adjustable DC power source 124 across the primary 94 of the transformer 96. The switching devices 162 and 164 may preferably be implemented as transistors having integral anti-parallel connected diodes 170 and 172.

Figure 9:
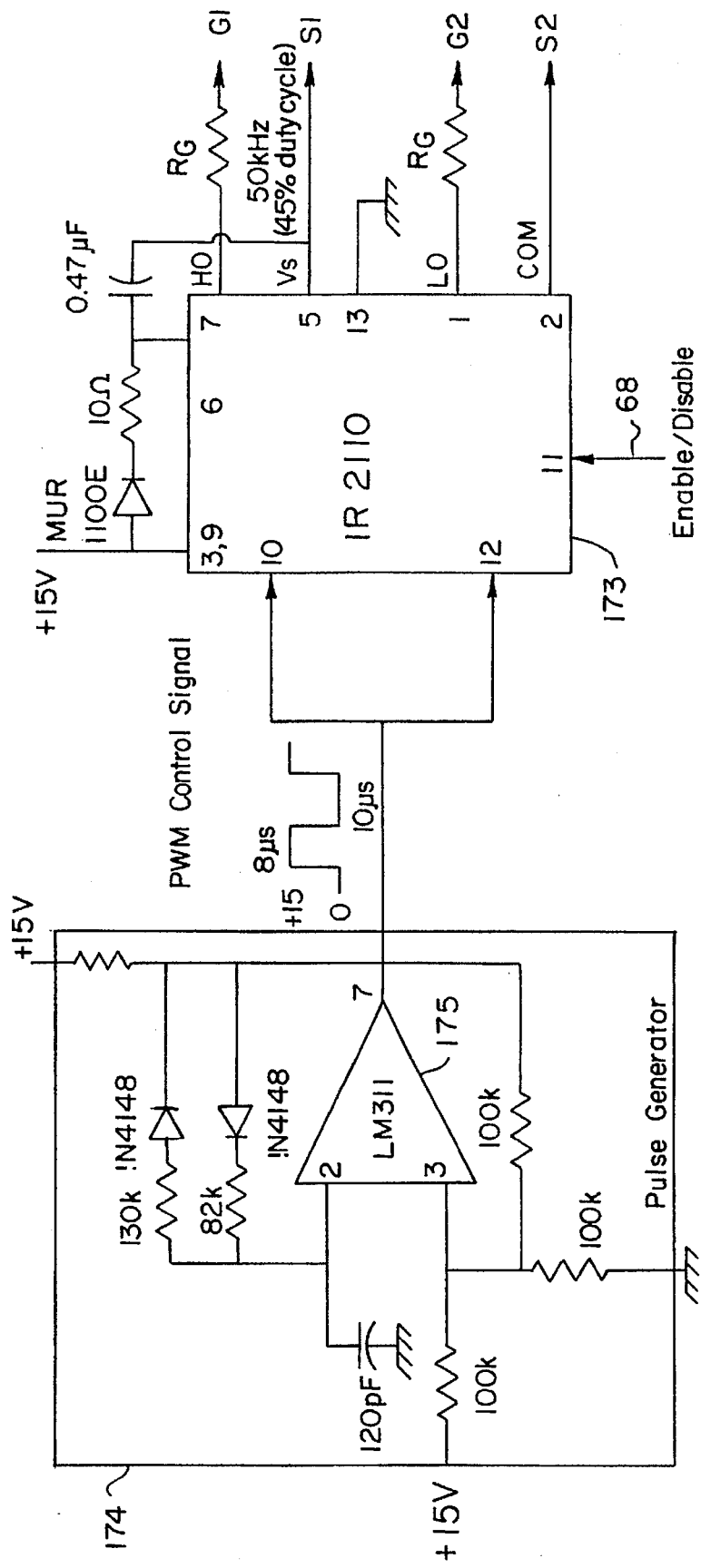
FIG. 9 is a schematic circuit diagram of a switch controller for the charge equalization converter shown in FIG. 8.
Figure 10:
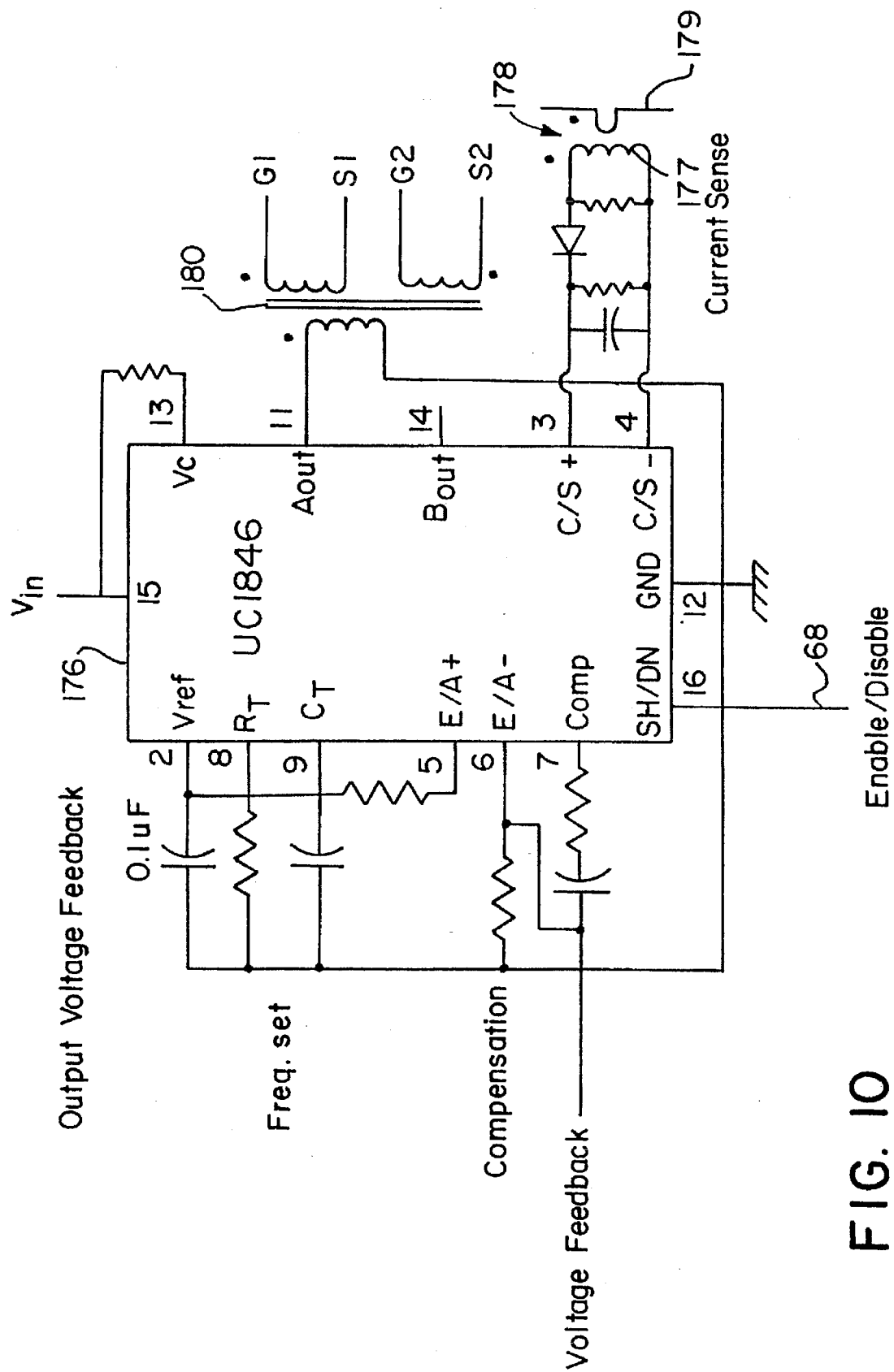
FIG. 10 is a schematic circuit diagram of an alternative switch controller for the charge equalization converter shown in FIG. 8.

Switching of the transistors 162 and 164 is preferably controlled, in a conventional manner, by the control system 64. Conventional circuitry may be used to drive the gates of the transistor 162 and 164 to turn them on and off. An exemplary switch controller circuit is shown in FIG. 9. An off-the-shelf MOSFET Gate Driver 173, manufactured by International Rectifier (IR2110), is used to produce gate drive signals G1 at pin 7 and G2 at pin 1 for driving the transistors 162 and 164, respectively. Pins 5 and 2 of the gate driver 173 are connected to the source of transistor 162 and the source of transistor 164, respectively. A pulse generator circuit 174, built around an amplifier 175, provides a pulse width modulation (PWM) control signal to the gate drive 173 at pins 10 and 12. The pulse width is preferably limited to 45% of the period of the modulator to ensure that energy stored in the magnetizing inductance of the transformer 96 is totally reset each cycle. Another way to ensure that the stored energy is reset is by using a peak current control algorithm which ensures that the peak current on the primary side of the transformer is always limited to a preset value so as to prevent transformer saturation. An exemplary switch controller circuit which implements this scheme is shown in FIG. 10. This circuit employs a Unitrode 1846, 2846, or 3846 Current Mode PWM Controller 176. Current sense is provided to the controller 176 at pins 3 and 4 via the secondary winding 177 of a transformer 178 whose primary winding 179 is connected in series with the primary winding of the transformer 96. Drive signals G1, S1, G2, and S2 are provided through a transformer 180 connected to pin 11 of the controller 176. The drive signals are provided to the transistors 162 and 164 such that the peak current sensed at pins 3 and 4 does not result in saturation of the charge equalization transformer 96 and such that the magnetizing current is reset each cycle. Note that an enable/disable signal may be provided to pin 11 of the gate driver 173 or pin 16 of the controller 176. This signal may be provided on the line 68 from the charger control system 64. Thereby, the charge equalization converter 90 may be enabled for charge equalization and disabled during bulk charging periods. Note also that either of the controllers shown in FIG. 9 or FIG. 10 may be used to control a flyback topology converter as well as the forward converter shown in FIG. 8.

Preferably, the switching devices 162 and 164 are switched at a high switching frequency. For example, a switching frequency of 50 kHz may be used, although any other high switching frequency might also be used. The specific choice of a switching frequency will impact the design of the converter 92 and the transformer 96. Higher switching frequencies allow a reduction in the size of the transformer 96. However, additional switching losses in the semiconductor switches 162 and 164 may be incurred at higher frequencies. Hence, a compromise design may be used to achieve the balance of efficiency and size which is required by the user.

When the transistors 162 and 164 are turned on, the input source voltage $V_s$ is applied across the primary winding 94 of the transformer 96. A corresponding voltage, related to $V_s$ by the turns ratio of the transformer 96, then appears across the secondary windings 100, 102, and 104 of the transformer 96. This causes the secondary diodes 106, 108, and 110 to become forward biased. Charging currents $I_1$, $I_2$, and 13 begin to ramp up in the secondary windings 100, 102, and 104, respectively. The rate of ramp up of these secondary currents is governed by the DC source voltage $V_s$, the corresponding battery cell voltage $V_{b1}$, $V_{b2}$, or $V_{b3}$, and the associated leakage inductance $L_1$, $L_2$, or $L_3$, as given by Equation 2.

When the transistors 162 and 164 are turned off, the voltage $V_s$ is removed from the primary winding 94. However, the current which has built up in the magnetizing inductance 160 cannot immediately drop to zero. Therefore, a free wheeling current will flow through diodes 166 and 168. The diodes 166 and 168 thus reset the energy stored in the magnetizing inductance 160. During this resetting period, a voltage of opposite polarity to the source voltage $V_s$ will appear on the primary 94 and secondary windings 100, 102, and 104 of the transformer 96. This causes the secondary currents $I_1$, $I_2$, and $I_3$ to decay rapidly to zero as the diodes 106, 108, and 110 become reverse biased.

To analyze the transfer of energy to the battery cells 72, 74, and 76 in more detail, the cells 72, 74, and 76 may be assumed to be capacitors, with their initial charge conditions set to reflect the initial state of charge of the battery cells 72, 74, and 76. This is a valid assumption, since the charge equalization system 52 of the present invention can be used to charge, and equalize the charge among, any energy storage element, including battery cells or capacitors. As mentioned above, no leakage coupling is assumed to exist between the individual secondary windings 100, 102, and 104. The validity of this assumption will be discussed in more detail below.

Figure 11:
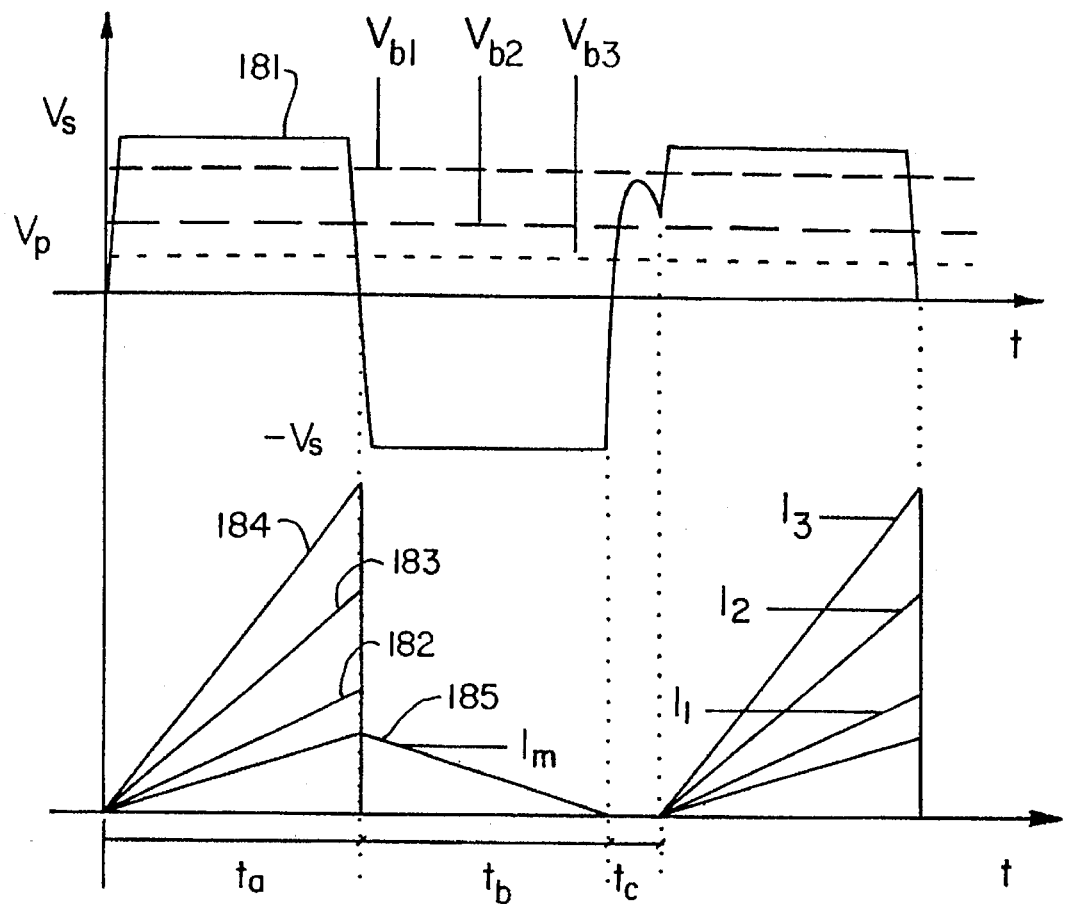
FIG. 11 is a graph of typical voltage and current waveforms for the charge equalization converter shown in FIG. 8.

FIG. 11 shows voltage and current waveforms for the converter 90 during the three modes of operation indicated by time periods $t_a$, $t_b$, and $t_c$. The first mode, during period $t_a$, is initiated when both transistors 162 and 164 are turned on. As shown by voltage waveform 181, the voltage $V_p$ applied to the primary winding 94 equals the source voltage $V_s$ during this period. The secondary currents, $I_1$, $I_2$, and $I_3$ indicated by waveforms 182, 183 and 184, respectively, and the primary winding, magnetization current, $I_m$, indicated by waveform 185, can be related by a first order differential equation, as follows:

$$L \frac{d}{dt} \bar{I} = R\bar{I} + K\bar{V} + \bar{V}_{DC}; \qquad (3)$$

where:

$\bar{I}$ and $\bar{V}$ are current and voltage vectors given by:

$$\bar{I} = \begin{bmatrix} I_1 \\ I_2 \\ I_3 \\ I_m \end{bmatrix}; \bar{V} = \begin{bmatrix} V_{b1} \\ V_{b2} \\ V_{b3} \end{bmatrix}; \qquad (4)$$

$\bar{V}_{DC}$ is a column source voltage matrix;

L is a 4×4 diagonal equivalent inductance matrix;
R is a 4×4 equivalent resistance matrix; and
K is a 4×3 constant matrix.

The L, R, and K matrices are functions of the parasitic inductances and resistances of the converter 92. For capacitive storage elements 72, 74, and 76, the cell voltages $V_{b1}$, $V_{b2}$ and $V_{b3}$ are related to the charging currents $I_1$, $I_2$ and $I_3$ by:

$$C \frac{d}{dt} \overline{V} = \overline{I}; \qquad (5)$$

where:

C is a 3×3 diagonal capacitance matrix.

The second mode of operation of the converter 90, indicated by period $t_b$, is initiated by turning off both the transistors 162 and 164. At this point, the voltage across the primary winding $V_p$ reverses to $-V_s$. The secondary currents $I_1$, $I_2$, and $I_3$ rapidly decay to zero. The magnetizing energy, indicated by the magnetizing current $I_m$, is gradually reset to zero by conduction through the primary side diodes 166 and 168. The magnetizing current $I_m$ during this period is given by:

$$L_m \frac{dIm}{dt} = -V_{DC}. \qquad (6)$$

When the magnetizing current $I_m$ reaches zero, at the end of period $t_b$, the primary side diodes 166 and 168 stop conducting. At this point, during $t_c$, all currents in the charge equalization system 52 will be zero. Note that when the magnetizing current $I_m$ reaches zero, the magnetizing inductance 160 will begin to resonate with the natural capacitance of the diodes 166 and 168. This is due to the reverse recovery of the primary side diodes 166 and 168, and is reflected in an oscillation of the primary voltage waveform 174 during the interval $t_c$.

As shown in FIG. 11, the input voltage $V_s$ applied to the primary winding 94 is greater than the voltage level on each energy cell 72, 74, or 76. Thus, assuming a 1:1 turns ratio on the transformer, during the charge delivery period $t_a$ a charging current is generated which flows to each of the energy cells. More charging current flows to those cells which are less fully charged, however, some current flows to each of the cells. As each cell reaches the $V_s$ voltage level, no further charging current will be delivered to that cell.

Figure 12:
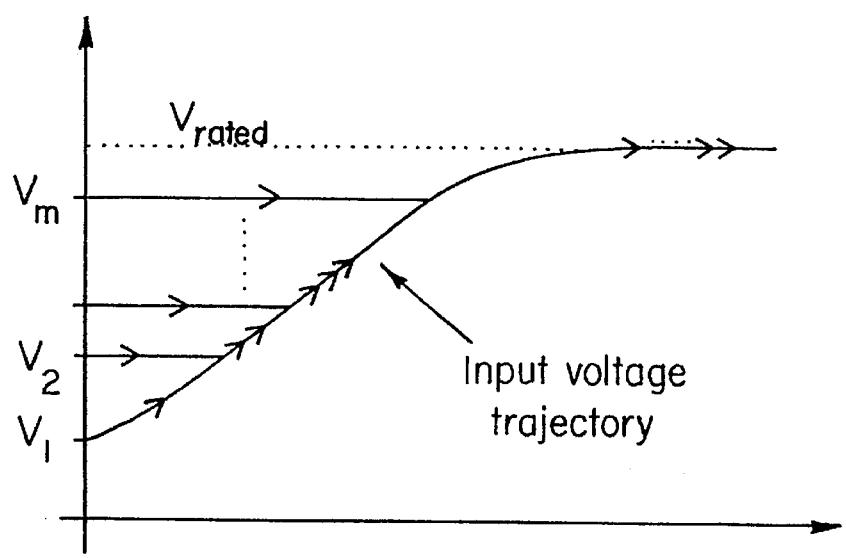
FIG. 12 is a graph of an input source voltage trajectory for the charge equalization converter of the present invention which may be used for charge tapering of multiple battery cells.

By controlling the supply voltage level $V_s$, it is possible to direct charge current exclusively and preferentially to those cells which are in most need of charging. Such control can be provided by the pre-regulator stage DC to DC converter 124 as shown in FIG. 4. The pre-regulator stage 124 can be controlled by the sensing and control system 64 to provide a source voltage $V_s$ which coincides with, or is slightly greater than, the voltage on the weakest cell within the battery string 56. Thus, charge current will be delivered exclusively to that cell until it reaches the source voltage level $V_s$. When this cell becomes charged to the $V_s$ level, the pre-regulator stage 124 can be adjusted to apply a gradually increasing voltage level $V_s$ to charge the other battery cells in the battery string 56. FIG. 12 shows a preferable input source voltage trajectory for the charge equalization converter 90 of the present invention. At the beginning of charge equalization, the source voltage $V_s$ is set equal to the weakest charge battery cell at voltage level $V_1$. Over the charge equalization period, the voltage $V_s$ is slowly increased above the voltage levels of the other battery cells $V_2-V_m$, eventually reaching the normal fully charged voltage level $V_{rated}$ of the battery cells. Thus, at the beginning of the charge equalization period, only the weakest cell will receive charging current. Each other battery cell, of progressively higher initial charge value, will receive a charging current as charge equalization proceeds.

Note also, that a controllable pre-regulator stage 124 can also be used to track the nominal battery cell voltage as it varies due to temperature and aging effects. Thus, as the nominal fully charged battery cell voltage decreases over the life of the battery, the maximum source voltage level $V_s$ can be reduced by controlling the pre-regulator converter 124.

To gain more insight into the effect on charge equalization of coupling between the secondary windings 100, 102, and 104 of the transformer 96, the charging current $I_1$ during the charge equalization period $t_a$ may be written as:

$$L_{s1} \frac{dI_1}{dt} = V_s - (r_p + T_1 r_1)I_1 - \left( r_p - \frac{L_p}{L_2} r_2 \right) I_2 - \qquad (7)$$

$$\left( r_p - \frac{L_p}{L_3} \right) I_3 + r_p I_m - T_1 V_{b1} + \frac{L_p}{L_2} V_{b2} + \frac{L_p}{L_3} V_{b3};$$

where:

$$T_1 = 1 + \frac{L_p}{L_m} + \frac{L_p}{L_2} + \frac{L_p}{L_3} \; ; L_{s1} = L_p + T_1 L_1; \qquad (8)$$

where the subscript p refers to the primary side components; and the number subscripts refer to each of the secondary side components.

From Equation 7, it is clear that the individual secondary windings are coupled through the primary side impedance consisting of the leakage inductance $L_p$ and resistance $r_p$. The effect of the primary side resistance $r_p$ is very small. This is because the primary side resistance drop in a well designed converter can be made very small compared with the DC bus voltage. Moreover, the effect of the leakage inductance $L_p$ can be minimized by making the ratio of the primary side inductance very small in comparison to all other inductances in the circuit. This can be accomplished through conventional converter design and component layout techniques.

Figure 13:
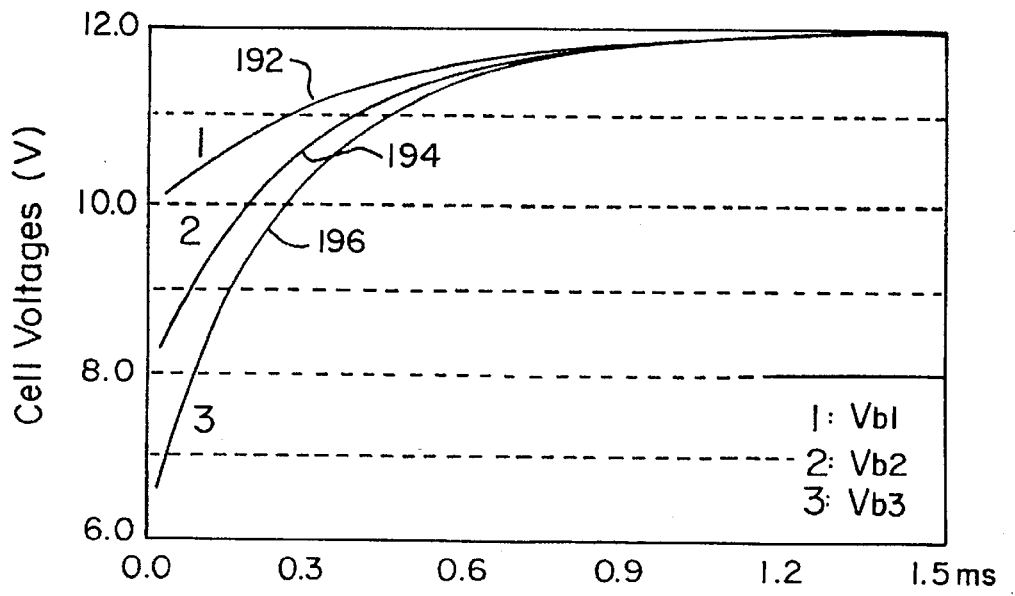
FIG. 13 is a graph of battery cell voltages versus time for charge equalization in accordance with the present invention of three initially differently charged energy storage cells.
Figure 14:
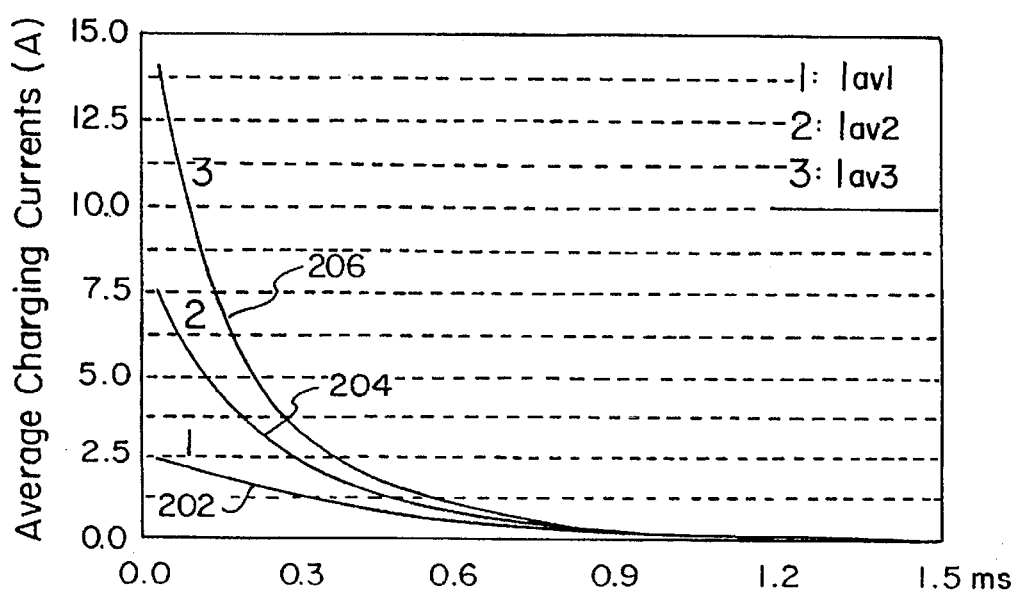
FIG. 14 is a graph of the average cell charging current during the charge equalization period shown in FIG. 13.

Using Equations 3-6, the response of the charge equalization converter 90 for a given set of initial conditions can be found. Thus, parameters such as the initial voltage level on the cells 72, 74 and 76 and the relative primary and secondary leakage inductances can be varied, and their effects can be investigated. Such an analysis was performed for the converter 90 shown in FIG. 8 having capacitive energy storage elements 72, 74 and 76. The initial charges on cells 72, 74, and 76 were set at 83%, 67%, and 50%, respectively, of a fully charged voltage level of 12 volts. The DC source voltage $V_s$ was set to 12 volts. The secondary leakage inductances $L_1$, $L_2$ and $L_3$ were all set to 1 μH. The primary side leakage inductance $L_p$ was set to 0.1 μH. The magnetizing inductance $L_m$ was set to a high value of 200 μH. FIG. 13 shows the cell voltage on cells 72, 74, and 76 at lines 192, 194, and 196, respectively, during the charge equalization period. FIG. 14 shows the corresponding average charging current applied to the cells 72, 74, and 76 at 202, 204, and 206, respectively, during the charging period. As shown in FIG. 13, the voltages on the cells 72, 74, and 76 are equalized, all reaching the nominal full charge value of 12 volts, within 1.5 ms. FIG. 14 shows that the weakest cell 76 draws more charging current than the more highly charged cells 72 and 74 as the cells begin to charge to the DC source voltage level. As the cell voltages begin to equalize, the charging currents steadily decrease. When the cells become fully charged, the average charging current drops to zero, and the charge equalization converter 90 can be turned off. Note that none of the cells 72, 74, or 76 can be overcharged, as the charging current decreases to zero as the cell voltage reaches the fully charged voltage level.

Figure 15:
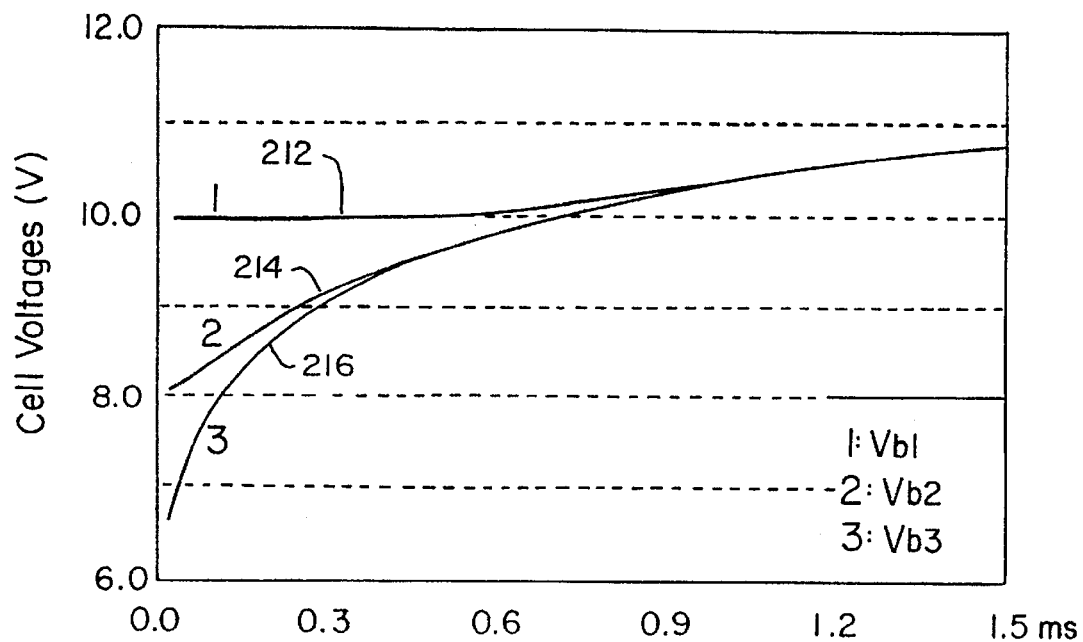
FIG. 15 is a graph of battery cell voltages versus time for charge equalization of three initially differently charged energy storage cells using a charge equalization converter having a transformer with a high primary side leakage inductance.
Figure 16:
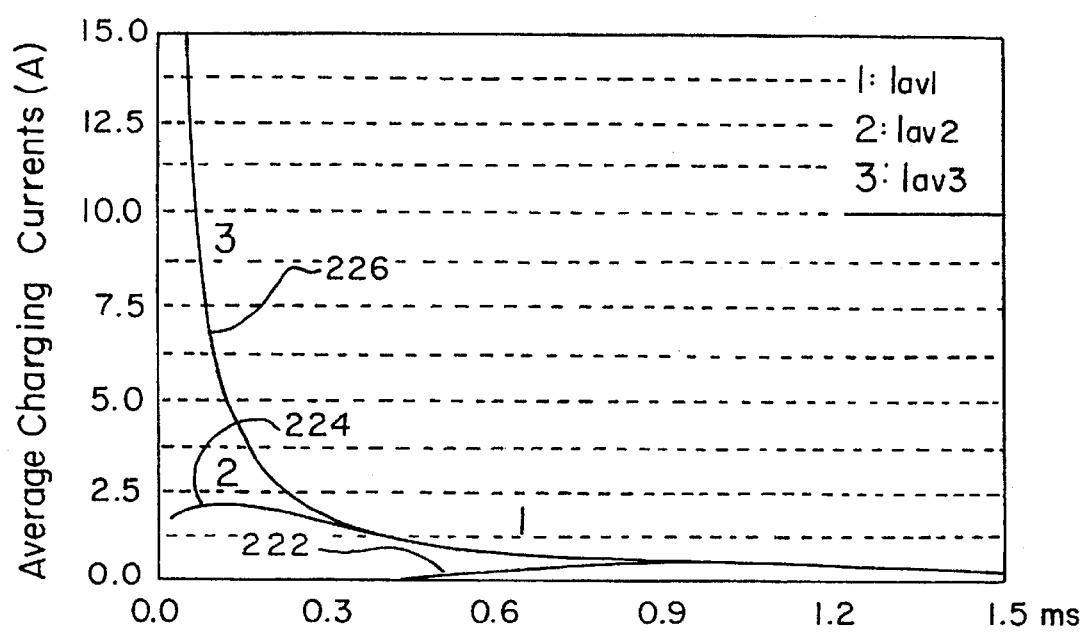
FIG. 16 is a graph of the average cell charging current during the charge equalization period shown in FIG. 15.

FIGS. 15 and 16 show the effect of coupling between the secondary transformer windings 100, 102, and 104 on the charge equalization process. FIG. 15, corresponding to FIG. 13, shows cell voltage on energy storage cells 72, 74, and 76 at 212, 214, and 216, respectively, during the charge equalization period. Similarly, FIG. 16, corresponding to FIG. 14, shows the average charging current to the battery cells 72, 74 and 76, at 222, 224, and 226, respectively, during the charge equalization period. The initial state of charge on the cells 72, 74, and 76, and the secondary leakage inductances $L_1$, $L_2$, and $L_3$ were the same for the charge equalization period illustrated in FIGS. 15 and 16 as for the charge equalization period illustrated in FIGS. 13 and 14, however, the primary side leakage inductance $L_p$ was increased to 2.0 μH. Thus, as predicted by Equation 7, the higher relative primary side leakage inductance $L_p$ will result in secondary to secondary coupling having a more significant effect on the charging currents, and on the charge equalization process as a whole. By comparing FIGS. 15 and 16 with FIGS. 13 and 14, it is apparent that the time required to equalize the cell voltages increases as secondary to secondary coupling effects increase. In fact, it takes nearly 4 ms, rather than 1.5 ms, for the energy storage cells 72, 74, and 76 to reach the fully charged voltage level of 12 volts in the latter case. This is because, due to the larger primary leakage inductance $L_p$, a larger voltage drop will appear across the leakage inductance 158, thus, less voltage will be available to drive the secondary currents $I_1$, $I_2$ and $I_3$. This, in turn, decreases the average charging current, resulting in a longer charging time. As shown in FIG. 16, the weakest energy cell 76, will initially draw most of the available current from the converter 90. As cell voltage increases, the charging current is diverted to the other energy cells 72 and 74. The increased charging current to the initially weakest energy cell is a desirable feature of employing a transformer 96 with a larger primary side leakage inductance $L_p$.

The effect on the charge equalization processes of differences among the secondary leakage inductances $L_1$, $L_2$ and $L_3$ is apparent from Equations 2 and 7. As the secondary leakage inductance $L_s$ of any one secondary winding increases, the charging current $I_{ch}$, and hence the average charging current, will decrease. Thus, it will take longer to charge a cell which is connected to a secondary winding of the transformer 96 which has a large secondary leakage inductance $L_s$. However, with a small primary side leakage inductance $L_p$, there will be little coupling between the secondary windings of the transformer 96. Thus, a large secondary leakage inductance in one of the secondary windings should not effect the charging current in any of the other windings. This is another advantage of the charge equalization system of the present invention. A mismatched leakage inductance on a secondary winding of the transformer 96 doesn't effect the charging current on any of the other windings, provided, of course, that cross coupling is held to a minimum by minimizing the primary side leakage inductance $L_p$.

As has already been mentioned, the charge equalization system of the present invention requires a transformer having multiple secondary windings which are employed to independently equalize the voltage on individual battery cells. Preferably, this multi-winding transformer has highly symmetrical energy transfer characteristics and tightly controlled parasitics, particularly low and controlled leakage inductances, in order to achieve rapid and well balanced equalization of the battery cells.

Figure 17:
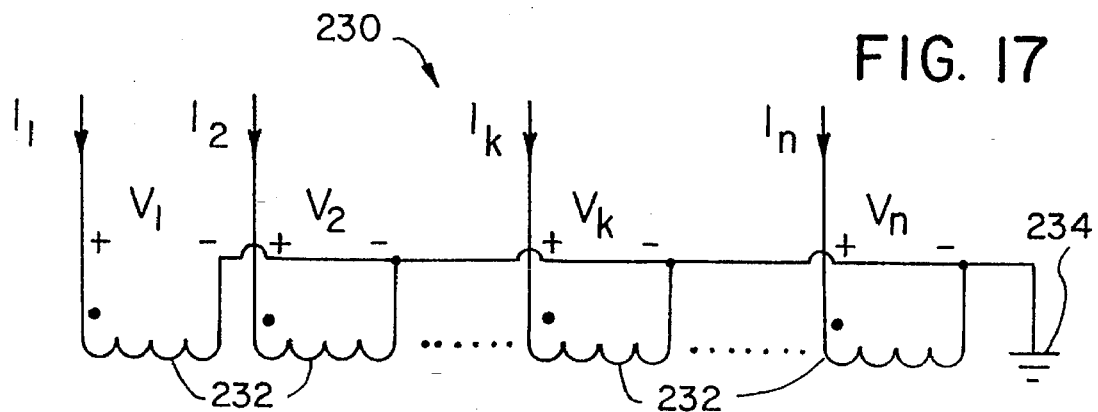
FIG. 17 is a schematic circuit diagram of a transformer having n windings all placed on a common core.

A multi winding transformer 230 having n windings 232, all placed on a common core, can be analyzed using the basic schematic circuit diagram, shown in FIG. 17. In this analysis, the currents taken by transformer capacitances are negligibly small, except at very high frequencies, and hence may be neglected. Thus, the assumed connection of the transformer windings 232 to ground 234 will not alter the relations among the terminal voltages of the various windings 232. An n-winding transformer can be analyzed using node-current equations, where each node is considered to be magnetically coupled to all other nodes. Thus, the steady state vector current equation for the multi winding transformer can be written as: I=Y·V, where: I is a matrix of vector winding currents; V is a matrix of the vector terminal voltages of the windings 232; and Y is a matrix of the complex self and mutual admittances of the nodes. Thus, the self admittance of a node i may be expressed as $y_{ii}$, and the mutual admittance of nodes i and j may be expressed as $y_{ij}$.

Figure 18:
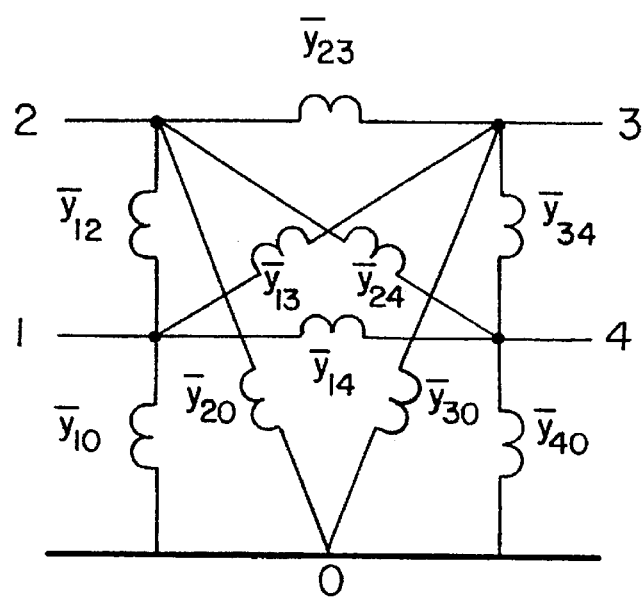
FIG. 18 is a schematic equivalent circuit diagram of a 4-winding transformer.

To represent an n-winding transformer with an equivalent circuit, the equivalent circuit typically must have the same number of free terminals as the transformer, i.e., 2 n terminals. However, if the currents taken by the transformer capacitance are neglected, as in this case, an n-winding transformer can be represented by a circuit with n+1 terminals. Thus, a 4 winding transformer may be represented by the equivalent circuit shown in FIG. 18. The equivalent circuit can be further simplified if the magnetizing currents are very small compared to the winding currents. In this case, the excitation admittances $\bar{y}_{io}$ can be omitted. This results in the further simplified equivalent circuit of FIG. 19. The values of the branch admittances in FIG. 19 can be determined experimentally by a number of conventional tests, where one of the windings 232 is excited with all of the other windings short circuited.

For the charge equalization system 52 of the present invention, the multi-winding transformer 96 is preferably implemented as a coaxial winding transformer (CWT). The CWT has been demonstrated to have the desired properties of symmetrical and tightly controlled parasitics and symmetrical energy delivery on the transformer secondaries. Moreover, the CWT structure is both simple and inexpensive to implement. Thus, the CWT is an excellent choice for the capacitive output forward converter based charge equalization system 90 shown in FIG. 4. A conventional foil wound multi-winding transformer may also be used. However, the CWT allows the relative equalization rate between battery cells to be linear with respect to the battery cell voltages. This would not be the case with a conventional foil wound multi winding transformer.

Figure 20:
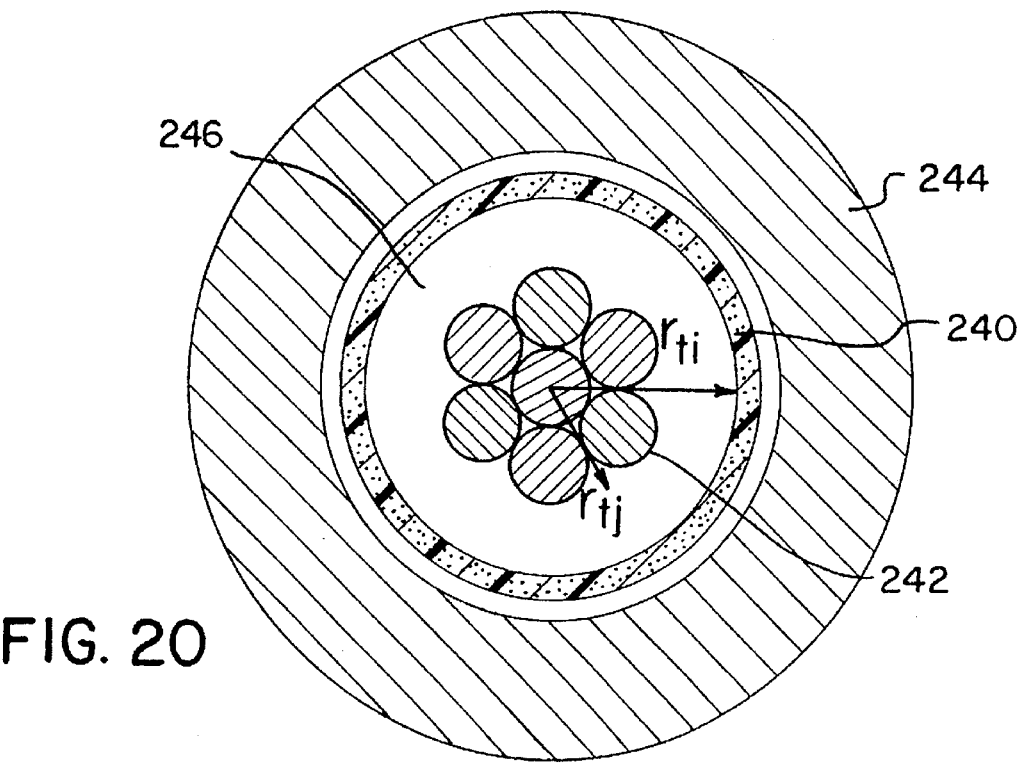
FIG. 20 is an illustrative cross-sectional view of a coaxial winding transformer.

A schematic cross section of a CWT is shown in FIG. 20. An outer conducting tube 240 forms one of the transformer windings at a radius $r_n$ from the center of the CWT. One or more conductors form the inner winding 242 which extends a radius $r_{ij}$ from the center of the CWT and which is wound completely inside the outer conductor 240. The transformer core 244 is placed outside of the outer conductor 240. With a voltage applied to the outer winding 240, a magnetizing current, and hence a magnetic flux, will be produced by the outer winding 240. The resulting flux will run tangentially to circular paths outside of the outer winding 240. Since the inner winding 242 is totally enclosed by the outer winding 240, all flux produced by the outer winding 240 will link to the inner winding 242. The converse is nearly, but not completely, true. When the relative permeability of the core 244 is many times the permeability of the space 246 between the inner winding 242 and the outer winding 240, nearly all the flux produced by the inner winding 242 will link to the outer winding 240. In any case, the majority of flux produced by one winding 240 or 242 will link with the other winding 242 or 240. Thus, a voltage applied to one winding will induce a voltage proportional to the applied voltage times the turns ratio of the windings in the other winding.

A leakage field can only exist in the winding space 246 between the inner winding 242 and outer winding 240. Thus, leakage inductance can be controlled by controlling the inner winding space 246. If the excitation frequency of the transformer is sufficiently high, so that all of the transformer current is crowded within a thin skin of the outer winding at radius $r_{ti}$, or if the actual thickness of the outer winding 240 is small relative to radius $r_{ti}$, then the inner winding leakage inductance may be calculated to be:

$$L_{leak} = \frac{N_s^2 \mu_o}{8\pi} \left[ 1 + 4\ln\left(\frac{r_{ti}}{r_{tj}}\right) \right] l_{turn}; \quad (9)$$

where:

$N_s$ is the primary to secondary turns ratio of the CWT;

$\mu_0$ is the excitation frequency of the CWT; and $l_{turn}$ is the length of the transformer turns.

Note that Equation 9 produces the inductance for a coaxial transmission line when $N_s$ is set to 1. From Equation 9 it is also apparent that, in order to minimize the leakage inductance $L_{leak}$, the space between the inner and outer windings should be kept small, i.e., the ratio of the radius $r_{ti}$ to radius $r_{tj}$ should be kept near to 1. The leakage on the inner winding 242 results from flux produced by the inner winding which does not completely link to the outer winding 240. However, from the outer winding side, all flux produced by the outer winding 240 will link to the inner winding 242, because all of the flux produced by the outer winding 240 is located outside of $r_{ti}$. Hence, there is no leakage reactance on the outer winding side.

Figure 21:
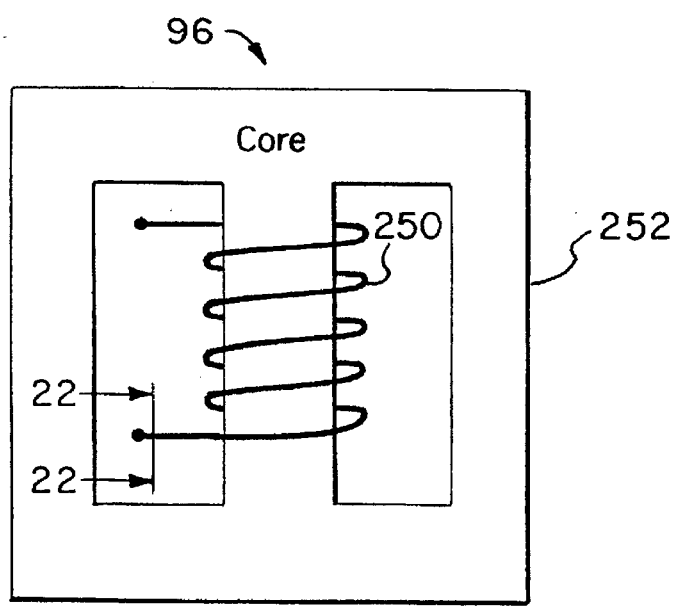
FIG. 21 is an illustrative view of a multi-winding coaxial winding transformer such as may be used in the charge equalization system of the present invention.
Figure 22:
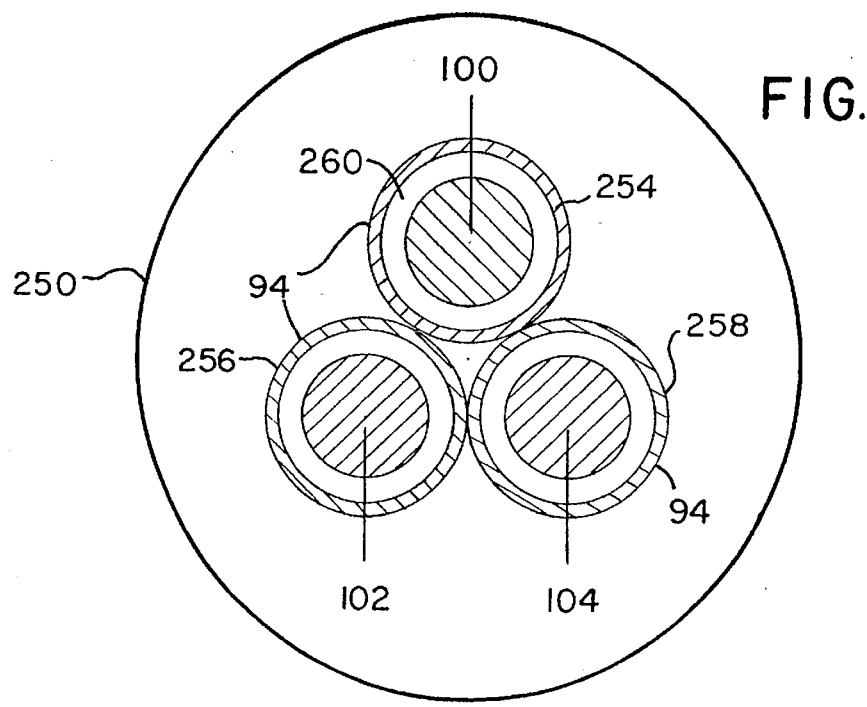
FIG. 22 is a cross-sectional view of the multi-winding coaxial winding transformer winding of FIG. 21 as taken along the line 22–22.

A preferred multi-winding CWT for use in the charge equalization circuit 52 of the present invention is described with reference to FIG. 21 and FIG. 22. The structure described is for a CWT having a single primary winding and 3 secondary windings. Of course, the CWT structure described may be modified to include any number of secondary windings sufficient to provide charge equalization in accordance with the present invention to a corresponding number of battery cells. The CWT 96 includes a winding bundle 250 wound around a magnetic core 252. The manner of winding the bundle around the core is not important. A cross section of the winding bundle 250 is shown in FIG. 22. The winding bundle 250 includes multiple shielded or coaxial cables 254, 256, and 258. The outer conductors of the coaxial cables 254, 256, and 258 are connected together in parallel to form the primary winding 94. Each of the inner conductors of the coaxial cables 254, 256, and 258 form one of the secondary transformer windings 100, 102, and 104, respectively.

The resulting transformer 96 has a 1:1 turns ratio between each of the secondary windings 100, 102, and 104, and the primary winding 94. Thus, in order to take advantage of the CWT's characteristics, the transformer must be supplied by a low voltage source where $V_s$ is approximately equal to the rated voltage of the battery cells 72, 74, and 76. As shown in FIG. 4, the charge equalization circuit 52 is preferably provided power by a higher voltage DC source, such as the bulk charger 50 which is used to charge the battery string 56 as a whole and hence has a much larger voltage level. Thus, a stepdown stage is needed. The DC-to-DC converter of the pre-regulator stage 124 is preferably used to provide the required voltage stepdown. As was described earlier, the pre-regulator stage 124 is also required in order to provide control of the source voltage $V_s$ to direct more charge to the weakest battery cell at the initiation of charge equalization. Thus, the stepdown stage and pre-regulator stage may preferably be combined into a single DC-to-DC converter 124. Alternatively, a stepdown transformer (not shown) in combination with the simple pre-regulator stage 124 may be used.

For charge equalization in accordance with the present invention, it may be assumed that one of the battery cells 72, 74, or 76 may demand a high percentage of the total equalization charge current every cycle. Thus, using the 300 W converter rating example discussed earlier, the worst case maximum current for any one of the secondary windings 100, 102, or 104 is nearly 24 A for a 12.5 V nominal battery cell voltage. This worst case scenario dictates that each secondary winding 100, 102, and 104, must be rated for a large portion of the total charging current. However, such a current is rather high for charge equalization purposes in general. Preferably, the secondary windings 100, 102, and 104 are sized for a portion of the total rated current. A scaling factor $K_x$ can be used to define the maximum charging current expected in any one of the secondary windings 100, 102, or 104, as a percentage of the total rated current of the charge equalization circuit 90. For the example presented above, a scaling factor of $K_x = 25\%$ may be used. Thus, the secondary windings 100, 102, and 104 may be designed for a maximum current of up to 6 A.

Figure 19:
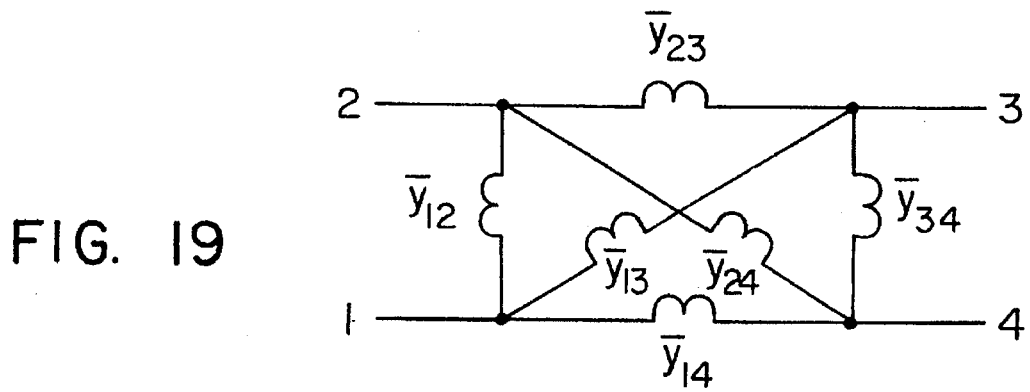
FIG. 19 is a simplified schematic equivalent circuit diagram of a 4-winding transformer.
Figure 23:
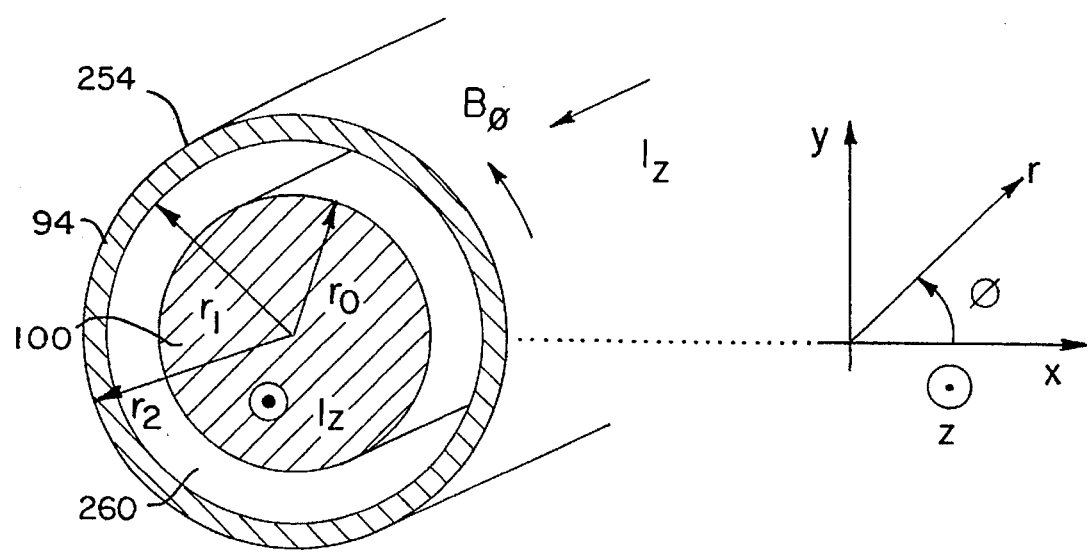
FIG. 23 is a cross-sectional view, in perspective, of an inner and outer conductor pair of a coaxial winding transformer winding.

For the multiple secondary winding CWT 96, the equivalent transformer circuit of FIG. 19 can be further simplified. As has been already described, the leakage fields between the primary winding 94 and each of the secondary windings 100, 102, and 104, is dominated by the spacing 260 between each individual secondary 100, 102, or 104 and its corresponding primary tube. At high frequencies, proximity effects force the bulk of the return current of each of the secondary windings 100, 102, and 104 to exist primarily in their corresponding primary tube. As a result, very little coupling between the individual secondary windings exists, since each secondary is wound totally inside one of the primary turns. This phenomenon can be examined in more detail by carrying out a field analysis for one of the secondary windings 100, as shown in cross section and in perspective in FIG. 23.

The resulting problem can be solved using Maxwell's equations in cylindrical coordinates. The current density distribution $J_{zi}$ within the inner winding 100, and within the outer conductor $J_{zo}$ are:

$$J_{zi}(r) = \frac{kI I_o(kr)}{2\pi r_o I_1(kr_o)} \; ; \quad (10)$$

$$J_{zo}(r) = \frac{kI}{2\pi r_1} \cdot \frac{K_1(kr_2)I_o(kr) + I_1(kr_2)K_o(kr)}{I_1(kr_1)K_1(kr_2) - I_1(kr_2)K_1(kr_1)} \; ; \quad (11)$$

where:

$I_1$ and $K_1$ are the modified Bessel functions of the first and second kind of order 1; and where:

k is defined as:

$$k = \frac{(1+j)}{\delta} \; ; \; \delta = \sqrt{\frac{2}{\omega \mu \sigma}} \; ; \quad (12)$$

where:

$\delta$ is the skin depth.

Figure 24:
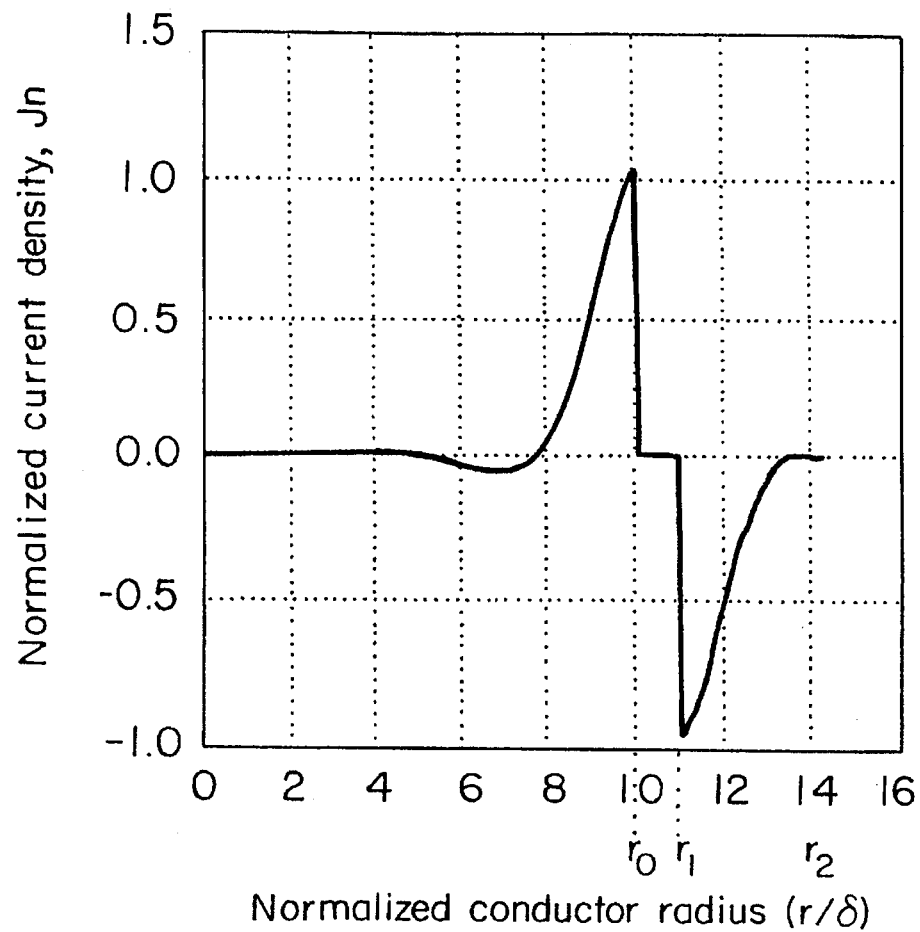
FIG. 24 is a graph of normalized current density distribution in an inner and outer conductor pair of a coaxial winding transformer winding.

A plot of this current density distribution within the coaxial cable 254 is shown in FIG. 24. In this Figure, the current density has been normalized to the value corresponding to a uniform current density distribution over one skin depth. The thickness of the outer conductor of the coaxial cable 154 is assumed to be 3δ. The radius of the inner conductor 100 is assumed to be 10δ. These are typical dimensions for a CWT employed at high frequencies. As is seen in FIG. 24, the bulk of the current is concentrated near the space 260 between the inner conductor 100 and the outer conductor. This concentration of current is due to proximity effects and forms the high field region. The concentration of current within the coaxial cable 254 justifies the assumption that very little leakage coupling exists between the separate secondary windings 100, 102, and 104 at high frequencies.

Figure 25:
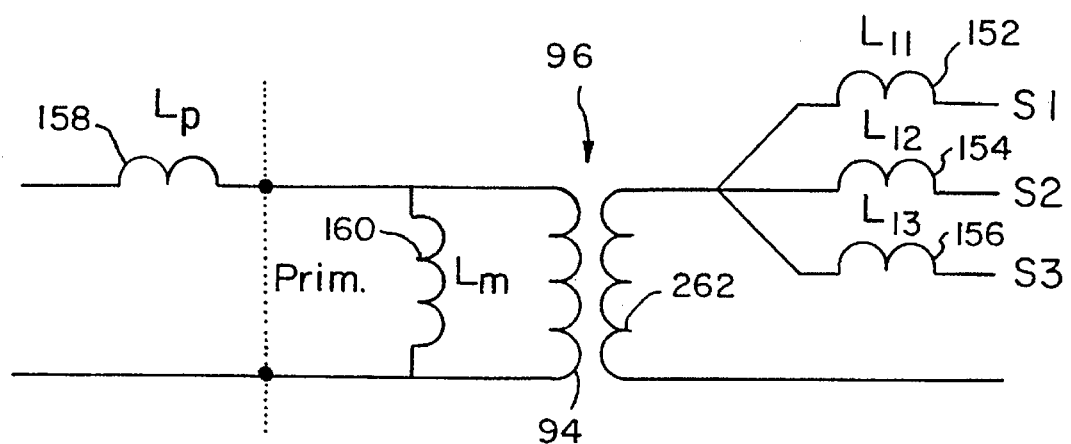
FIG. 25 is a schematic equivalent circuit diagram of the multi-winding coaxial winding transformer shown in FIG. 21.

Thus, the equivalent circuit of a multiple secondary winding CWT 96 as shown in FIG. 25 may be obtained by omitting the secondary-to-secondary coupling admittance links shown in FIG. 19. The secondary side of the transformer 96 is represented by an ideal secondary winding 262 and secondary leakage components 152,154, and 156. Leakage components are shown only on the secondary side, since nearly zero leakage inductance exists on the primary side due to the fact that in the CWT structure any field generated by the primary winding 94 will link all of the secondary windings. The inductance 158 on the primary side of the transformer 96 is the external circuit inductance due to terminations. In a well designed transformer, this primary leakage inductance $L_p$ can be made very small. As was discussed in more detail above, coupling between the secondary windings is only a function of the relative value of $L_p$ compared to the other circuit inductances.

A CWT having 3 secondary windings was built in accordance with the structure described above. The operating frequency of the CWT was selected to be 50 kHz. The resulting magnetizing and leakage inductances were measured to be: $L_m$=170 μH, $L_{l1}$=320 nH, $L_{l2}$=320 nH, $L_{l3}$=310 nH, and $L_p$<500 nH. Note that the leakage inductances of the transformer secondaries, $L_{l1}$, $L_{l2}$, and $L_{l3}$, are very symmetrical. The total secondary side leakage inductances of the converter were in the range of 2.0 μH due to the effect of additional wires used to connect the secondary windings 100, 102, and 104 to the battery cells 72, 74, and 76.

The CWT described was used in a 200 W prototype charge equalization converter 52 which was built in accordance with the present invention using a forward converter topology. The charge equalization circuit 52 was used to charge 3 Titan 12 volt batteries from Exide. These are deep cycle gel-cell batteries having a full charge voltage of 13.6 volts and which can be discharged down to 9.5 volts. The main transistors 162 and 164 in the charge equalization converter 92 were 60 V/60 A MOSFET devices. The primary side diodes 166 and 168 were 45 V/25 A dual modules. The secondary diodes 106, 108, and 110 were Shottky 45 V/20 A dual modules. The switching frequency of the charge equalization converter 92 was 50 kHz. The duty cycle of the converter 92 was set at 45%, to guarantee the reset of the magnetization energy current. The battery cells 72, 74, and 76 were initially charged or discharged individually to have different initial states of charge. The initial battery voltages were 12.37 volts, 13.07 volts, and 13.39 volts. The source voltage $V_s$ was set to 16 volts, to increase the charging rate. In actual operational use, the source voltage $V_s$ would preferably be regulated in order to optimize the charging rate of the battery cells and to provide a means to track the nominal battery voltage as it varies due to temperature and age. For the experimental verification of the charge equalization system 52, however, the source voltage $V_s$ was fixed and not regulated. The charge equalization converter 90 was turned on for approximately 3.5 hours, and the individual cell voltage levels were recorded every 6 minutes.

Figure 26:
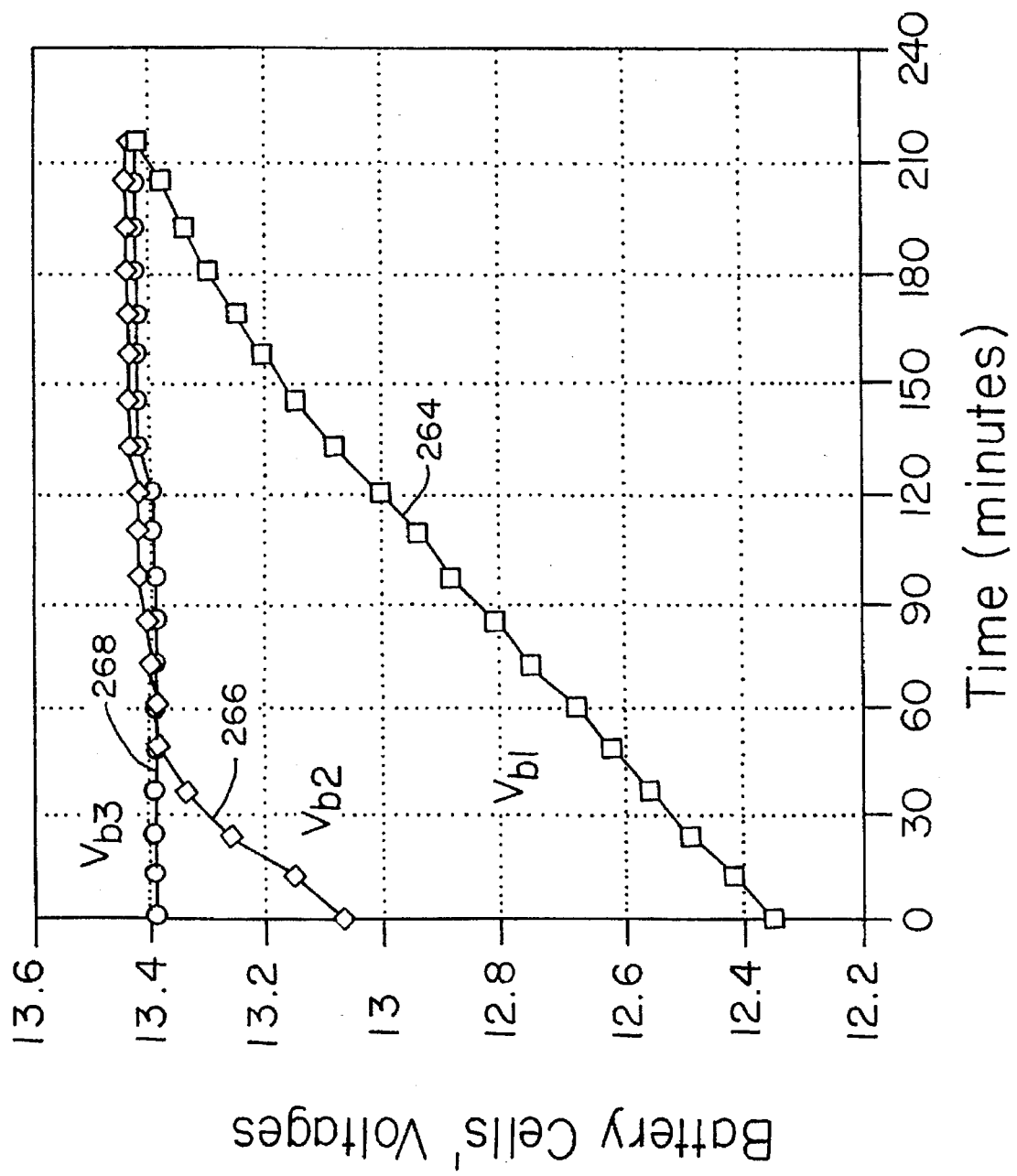
FIG. 26 is a graph of recorded battery cell voltages during charge equalization in accordance with the present invention of three initially differently charged battery cells using a forward charge equalization converter.
Figure 29:
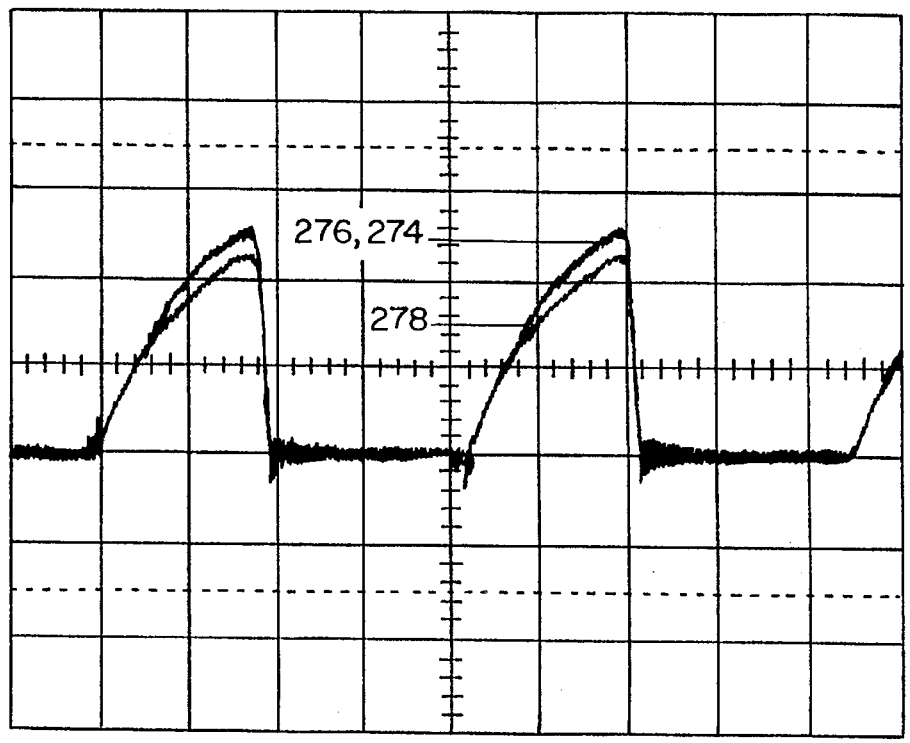
FIG. 29 is a graph showing the waveforms of battery charging current to three initially differently charged battery cells near the end of charge equalization in accordance with the present invention using a forward charge equalization converter.

A plot of battery cell voltages over the charge equalization period are shown at 264, 266 and 268 in FIG. 26. As can be seen, the individual battery cells were charged to the same nominal value at the end of the charge equalization period. FIG. 27 shows the voltage across the primary winding $V_p$ at 270 and the primary current $I_p$ at 272 for two switching cycles near the beginning of the charge equalization period. Charge currents for each battery cell are shown at 274, 276, and 278 for two cycles near the beginning and near the end of the charge equalization period in FIGS. 28 and 29, respectively. Note that the weakest cell draws more current 274 than the currents 276 and 278 drawn by the other battery cells. Note also, that as the battery cells charge, the charging current decreases and becomes more equal for each of the cells.

Figure 30:
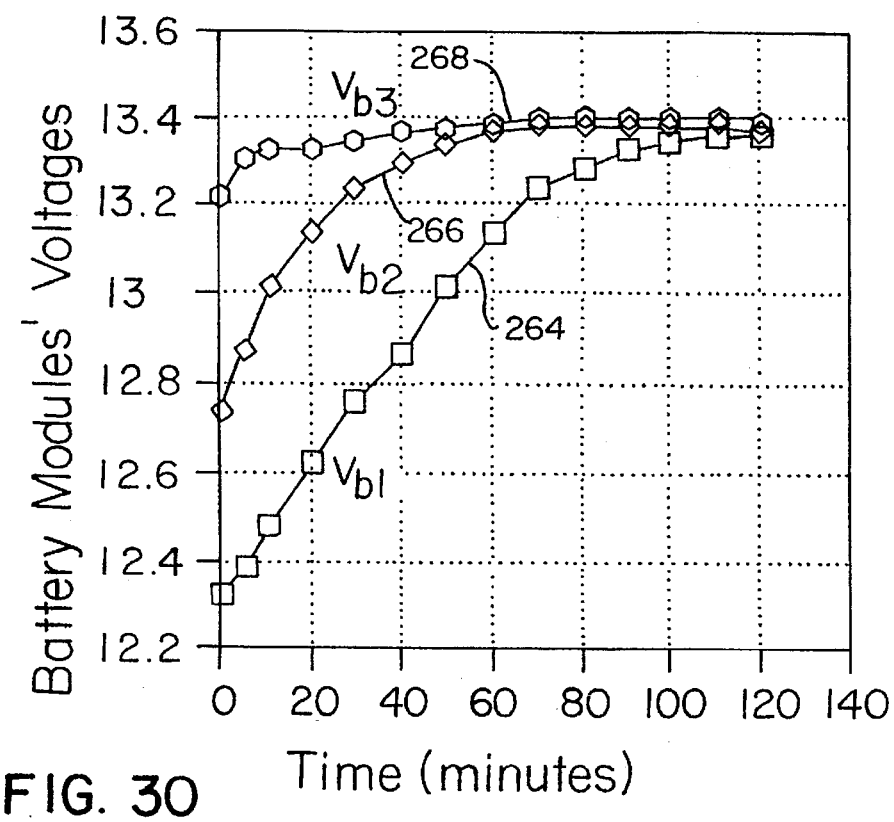
FIG. 30 is a graph of recorded battery cell voltages during charge equalization in accordance with the present invention of three initially differently charged battery cells using a flyback charge equalization converter.

A similar experimental verification was made for a charge equalization system 52 in accordance with the present invention using a charge equalization converter 90 employing a flyback type topology. A conventional 3:1:1:1 foil wound transformer was built. The switching frequency was chosen to be 50 kHz. The duty cycle of the converter was again set to 45% to guarantee the reset of the magnetizing energy current in the transformer. The same battery modules, with the same initial states of charge, as were used for verification of the forward converter topology were used to verify the flyback implementation. The charge equalization circuit was enabled for two hours. Individual cell voltages were recorded every six minutes. The resulting cell voltages over the charging period are shown in FIG. 30. FIG. 31 and FIG. 32 show individual cell charging currents for two cycles near the beginning and near the end of the charge equalization period, respectively. As shown in FIG. 30, the individual battery cells were charged to the same nominal value at the end of the charge equalization period.

It is understood that the invention is not confined to the particular embodiments set forth herein as illustrative, but embraces all such forms thereof as come within the scope of the following claims.

What is claimed is:

1. A charge equalizer for equalizing the charge on two or more energy storage cells connected in series, comprising:
    (a) a transformer having a single primary winding and plural secondary windings, wherein each secondary winding is adapted to be connected to a one of the energy storage cells;
    (b) power converter means for applying an equalization voltage signal to the primary of the transformer to induce a charging current in each secondary winding whose average magnitude is inversely related to a charge voltage level of the corresponding energy storage cell to equalize the charge on the energy storage cells; and
    (c) means for increasing a magnitude of the qualization voltage signal as the charge on the energy storage cells becomes equalized.

2. A charge equalizer for equalizing the charge on two or more energy storage cells connected in series, comprising:
    (a) a transformer having a single primary winding and plural secondary windings, wherein each secondary winding is adapted to be connected to a one of the energy storage cells;
    (b) a secondary rectifier connected to each secondary winding and adapted to be connected in series with the corresponding energy storage cell to half-wave rectify a charging voltage appearing on the secondary winding;

(c) a controllable DC voltage source for providing a DC source voltage;

(d) a DC-to-AC power converter having an input connected to the DC voltage source and an output connected to the primary of the transformer to apply an AC voltage signal to the primary of the transformer which causes the charging voltage to appear on the secondary windings and which induces a charging current in each secondary winding whose average magnitude is inversely related to a charge voltage level of the corresponding energy storage cell to equalize the charge on the energy storage cells; and (e) source voltage control means for gradually raising the DC source voltage level as the charge on the energy storage cells becomes equalized.

3. The charge equalizer of claim 2 wherein the transformer is a coaxial winding transformer.

4. The charge equalizer of claim 3 wherein the coaxial winding transformer includes plural coaxial cables corresponding to the number of secondary windings which are wound around a transformer core, wherein each coaxial cable includes an outer conductor and an inner conductor completely enclosed in the outer conductor, and wherein the outer conductors are connected in parallel to form the transformer primary winding and each inner conductor forms a transformer secondary winding.

5. The charge equalizer of claim 2 including a filter capacitor connected to each secondary winding and adapted to be connected in parallel with the corresponding energy storage cell.

6. The charge equalizer of claim 2 wherein the DC-to-AC power converter includes two converter switching devices and two diodes connected in a bridge formation between the DC voltage source and the primary of the transformer, and a converter controller for switching the converter switching devices in a sequence to produce the AC voltage signal from a DC source signal provided by the DC voltage source.

7. The charge equalizer of claim 6 wherein the converter switching devices are transistors.

8. The charge equalizer of claim 6 wherein the DC-to-AC power converter is a flyback converter.

9. The charge equalizer of claim 6 wherein the DC-to-AC power converter is a forward converter.

10. The charge equalizer of claim 2 wherein the controllable DC voltage source is a DC-to-DC converter.

11. The charge equalizer of claim 2 including sensing means for monitoring the voltage on each of the energy storage cells and a secondary fuse connected to each secondary winding, and wherein the source voltage control means includes means for raising the DC source voltage to a level sufficient to cause the charging current into one of the energy cells to increase to a level greater than a current rating of the fuse to clear the fuse attached to the corresponding secondary winding to disconnect the secondary winding from the energy storage cell when the sensing means detects a voltage on the energy storage cell which indicates that the cell is defective.

12. A charging system for charging a string of two or more energy storage cells connected in series, and for equalizing the charge on the energy storage cells, comprising:

(a) a bulk charging system having an input adapted to be connected to a source of AC power and an output adapted to be connected across the string of energy storage cells for applying a bulk DC charge voltage across the string of energy storage cells; and (b) a charge equalizer circuit including a transformer having a single primary winding and plural secondary windings wherein each secondary winding is adapted to be connected to a one of the energy storage cells, a power conversion means for applying a charge equalization voltage signal to the primary of the transformer to induce a charging current in each secondary winding whose average magnitude is inversely related to a charge voltage level of the corresponding energy storage cell to equalize the charge on the energy storage cells, and means for increasing a magnitude of the charge equalization voltage signal as the charge on the energy storage cells becomes equalized.

13. The charging system of claim 12 including sensing and control means for monitoring the voltage across the string of energy storage cells and for terminating bulk charging by removing the bulk DC charge voltage when the voltage across the string of energy storage cells reaches a bulk charge termination level.

14. The charging system of claim 13 wherein the bulk charge termination level is less than a nominal fully charged voltage level of the string of energy storage cells.

15. The charging system of claim 13 wherein the sensing and control means includes means for initiating application of the charge equalization voltage signal when the voltage across the string of energy storage cells reaches the bulk charge termination level.

16. The charging system of claim 12 including sensing and control means for monitoring the voltage across each of the energy storage cells and for terminating bulk charging by removing the bulk DC charge voltage when the voltage across any of the energy storage cells indicates that the cell is fully charged.

17. The charging system of claim 16 wherein the sensing and control means includes means for initiating application of the charge equalization voltage signal when the voltage across any of the energy storage cells indicates that the cell is fully charged.

18. The charging system of claim 12 wherein the bulk charging system includes an AC-to-DC converter having an input adapted to be connected to the AC power source and providing DC voltage at an output which is connected to provide DC power to both the bulk charging system and the charge equalizer circuit.

19. The charging system of claim 12 wherein the transformer is a coaxial winding transformer wherein each secondary winding is fully enclosed by an outer primary winding.

20. The charging system of claim 12 including a secondary rectifier connected to each secondary winding and adapted to be connected in series with the corresponding energy storage cell to half-wave rectify a charging voltage appearing on the secondary winding and wherein the power conversion means includes a DC-to-AC power converter having an input adapted to be connected to a DC voltage source and an output connected to the primary of the transformer to apply an AC voltage signal to the primary of the transformer which causes the charging voltage to appear on the secondary windings and which induces the charging current in each secondary winding.

21. The charging system of claim 20 wherein the DC-to-AC power converter is a flyback converter.

22. The charging system of claim 20 wherein the DC-to-AC power converter is a forward converter.

23. The charging system of claim 20 including a filter capacitor connected to each secondary winding and adapted to be connected in parallel with the corresponding energy storage cell.

24. The charging system of claim 12 wherein the power conversion means includes a DC-to-DC power converter having an input connected across the string of energy storage cells and having an output connected to an input of a DC-to-AC converter, the DC-to-AC converter having an output connected to the primary of the transformer to apply the charge equalization voltage signal thereto.

25. The charging system of claim 12 wherein the power conversion means includes a DC-to-AC power converter having an input connected across the string of energy storage cells and having an output connected to the primary of the transformer to apply the charge equalization voltage signal thereto.

26. A method of equalizing the charge on two or more energy storage cells connected in series, comprising the steps of:

(a) connecting each secondary winding of a transformer having plural secondary windings and a single primary winding to a one of the energy storage cells to be charged;

(b) applying a voltage signal to the primary of the transformer to induce a charging current in each secondary winding whose average magnitude is inversely related to a charge voltage level of the corresponding energy storage cell to equalize the charge on the energy storage cells; and (c) increasing a magnitude of the voltage signal as the charge on the energy storage cells becomes equalized.

27. The method of claim 26 wherein the transformer is a coaxial winding transformer.

28. The method of claim 26 wherein the step of applying a voltage signal to the primary of the transformer includes the steps of converting a DC source signal into an AC equalization signal, applying the AC equalization signal to the primary of the transformer, and half-wave rectifying a resulting equalization voltage signal which appears on each of the secondary windings.

29. The method of claim 28 comprising additionally the step of filtering the equalization voltage signal appearing on each of the secondary windings.

30. The method of claim 26 comprising additionally the steps of applying a bulk charge voltage across the series connected energy storage cells, and removing the bulk charge voltage when the voltage across the series connected energy storage cells reaches a bulk charge termination level.

31. The method of claim 30 wherein the bulk charge termination level is less than the nominal fully charged voltage level of the series connected energy storage cells.

32. The method of claim 30 wherein the step of applying the voltage signal to the primary of the transformer is initiated after the bulk charge voltage is removed from the series connected energy storage cells.

33. The method of claim 26 comprising additionally the steps of applying a bulk charge voltage across the series connected energy storage cells, and removing the bulk charge voltage when the voltage across any one of the energy storage cells indicates that the energy storage cell is fully charged.

34. The method of claim 33 wherein the step of applying the charge equalization voltage signal to the primary of the transformer is initiated after the bulk charge voltage is removed from the series connected energy storage cells.

35. A charge equalizer for equalizing the charge on two or more energy storage cells connected in series, comprising:

(a) a coaxial winding transformer having a single primary winding and plural secondary windings, wherein each secondary winding is adapted to be connected to a one of the energy storage cells, and wherein the coaxial winding transformer includes plural coaxial cables corresponding to the number of secondary windings and which are wound around a transformer core, wherein each coaxial cable includes an outer conductor and an inner conductor completely enclosed in the outer conductor, and wherein the outer conductors are connected in parallel to form the transformer primary winding and each inner conductor forms a transformer secondary winding; and (b) power converter means for applying an equalization voltage signal to the primary of the transformer to induce a charging current in each secondary winding whose average magnitude is inversely related to a charge voltage level of the corresponding energy storage cell to equalize the charge on the energy storage cells.

* * * * *

UNITED STATES PATENT AND TRADEMARK OFFICE
CERTIFICATE OF CORRECTION

PATENT NO. : 5,659,237
DATED : August 19, 1997
INVENTOR(S) : Deepakraj M. Divan, et al.

It is certified that error appears in the above-indentified patent and that said Letters Patent is hereby corrected as shown below:

In column 16, line 14 of the patent, delete "13" and insert in its place --$I_3$--

In column 24, line 54, Claim 1, delete "qualization" and insert in its place --equalization--

Signed and Sealed this

Twelfth Day of January, 1999

Attest:

Attesting Officer     *Acting Commissioner of Patents and Trademarks*